(12) United States Patent
Helvik et al.

(10) Patent No.: US 11,645,289 B2
(45) Date of Patent: May 9, 2023

(54) RANKING ENTERPRISE GRAPH QUERIES

(71) Applicant: MICROSOFT TECHNOLOGY LICENSING, LLC, Redmond, WA (US)

(72) Inventors: Torbjorn Helvik, Oslo (NO); Chen Xing, Bellevue, WA (US); Oivind Wang, Oslo (NO); Bard Kvalheim, Oslo (NO); Nicolai Bodd, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/296,747

(22) Filed: Jun. 5, 2014

(65) Prior Publication Data

US 2015/0220531 A1 Aug. 6, 2015

Related U.S. Application Data

(60) Provisional application No. 61/935,680, filed on Feb. 4, 2014.

(51) Int. Cl.
*G06F 16/2457* (2019.01)

(52) U.S. Cl.
CPC ............... *G06F 16/24578* (2019.01)

(58) Field of Classification Search
CPC .............. G06F 17/3053; G06F 16/24578
USPC .............................................. 707/749
See application file for complete search history.

(56) References Cited

U.S. PATENT DOCUMENTS

| | | | |
|---|---|---|---|
| 6,434,556 B1 | 8/2002 | Levin et al. | |
| 6,745,195 B1 | 6/2004 | Kornfein et al. | |
| 7,031,961 B2 | 4/2006 | Pitkow et al. | |
| 7,055,168 B1 | 5/2006 | Errico et al. | |
| 7,143,091 B2* | 11/2006 | Charnock | G06Q 10/10 |
| | | | 707/999.005 |
| 7,444,344 B2 | 10/2008 | Galindo-Legaria et al. | |
| 7,509,320 B2* | 3/2009 | Hess | G06F 16/24575 |
| 7,571,121 B2 | 8/2009 | Bezos et al. | |
| 7,577,718 B2 | 8/2009 | Slawson et al. | |
| 7,587,101 B1 | 9/2009 | Bourdev | |
| 7,640,236 B1 | 12/2009 | Pogue | |
| 7,756,945 B1 | 7/2010 | Andreessen et al. | |
| 7,761,447 B2 | 7/2010 | Brill et al. | |
| 7,783,630 B1 | 8/2010 | Chevalier et al. | |
| 7,788,245 B1 | 8/2010 | Eddings | |

(Continued)

FOREIGN PATENT DOCUMENTS

| | | |
|---|---|---|
| CN | 1666279 A | 9/2005 |
| CN | 101398836 A | 4/2009 |

(Continued)

OTHER PUBLICATIONS

U.S. Appl. No. 14/188,079, Notice of Allowance dated Sep. 7, 2017, 7 pages.

(Continued)

*Primary Examiner* — Hosain T Alam
*Assistant Examiner* — Saba Ahmed

(57) ABSTRACT

A graph query is executed against a graph index that connects actors with objects through edges. A graph ranking model is obtained and results of the graph query are ranked, using the graph ranking model, based upon edge data available from edges in the graph that match the query.

20 Claims, 17 Drawing Sheets

(56) References Cited

U.S. PATENT DOCUMENTS

| | | |
|---|---|---|
| 7,873,641 B2 | 1/2011 | Frieden et al. |
| 7,890,501 B2 | 2/2011 | Lunt et al. |
| 7,945,571 B2 | 5/2011 | Wanker |
| 7,958,116 B2 | 6/2011 | House et al. |
| 7,962,481 B2 | 6/2011 | Ganesh et al. |
| 8,005,817 B1 | 8/2011 | Amer-Yahia et al. |
| 8,060,513 B2 | 11/2011 | Basco et al. |
| 8,065,383 B2 | 11/2011 | Carlson et al. |
| 8,117,197 B1 | 2/2012 | Cramer |
| 8,204,870 B2 | 6/2012 | Mukkamala et al. |
| 8,204,888 B2 | 6/2012 | Frieden et al. |
| 8,209,349 B2 | 6/2012 | Howes et al. |
| 8,214,325 B2 | 7/2012 | Navas |
| 8,266,144 B2 | 9/2012 | Tankovich et al. |
| 8,301,764 B2 | 10/2012 | Konig et al. |
| 8,312,056 B1 | 11/2012 | Peng et al. |
| 8,341,017 B2 | 12/2012 | Payne et al. |
| 8,341,150 B1 | 12/2012 | Riley et al. |
| 8,346,765 B2 | 1/2013 | Guo et al. |
| 8,346,950 B1 | 1/2013 | Andreessen et al. |
| 8,380,562 B2 | 2/2013 | Toebes et al. |
| 8,386,515 B2 | 2/2013 | Bent et al. |
| 8,463,795 B2 | 6/2013 | Van Hoff |
| 8,538,959 B2 | 9/2013 | Jin et al. |
| 8,548,996 B2 | 10/2013 | Tareen et al. |
| 8,572,477 B1 | 10/2013 | Moskovitz et al. |
| 8,600,981 B1 | 12/2013 | Chau et al. |
| 8,601,023 B2 | 12/2013 | Brave et al. |
| 8,615,442 B1 | 12/2013 | Kapur et al. |
| 8,751,621 B2 | 6/2014 | Vaynblat et al. |
| 8,751,636 B2 | 6/2014 | Tseng et al. |
| 8,775,334 B1 | 7/2014 | Lloyd et al. |
| 8,782,036 B1 | 7/2014 | Chen et al. |
| 8,799,296 B2 | 8/2014 | Agapiev |
| 8,812,947 B1 | 8/2014 | Maoz et al. |
| 8,825,649 B2 | 9/2014 | Heimendinger et al. |
| 8,825,711 B2 | 9/2014 | Chan et al. |
| 8,874,550 B1 | 10/2014 | Soubramanien et al. |
| 8,886,633 B2 | 11/2014 | Smyth et al. |
| 8,898,156 B2* | 11/2014 | Xu .................. G06F 16/951 |
| | | 707/765 |
| 8,909,515 B2 | 12/2014 | O'Neil et al. |
| 8,984,098 B1 | 3/2015 | Tomkins et al. |
| 8,996,629 B1 | 3/2015 | Datar et al. |
| 8,996,631 B1 | 3/2015 | Staddon et al. |
| 9,165,305 B1 | 10/2015 | Chandra et al. |
| 9,177,293 B1 | 11/2015 | Gagnon |
| 9,195,679 B1 | 11/2015 | Svendsen |
| 9,223,835 B1 | 12/2015 | Mazniker et al. |
| 9,223,866 B2 | 12/2015 | Marcucci et al. |
| 9,438,619 B1 | 9/2016 | Chan et al. |
| 9,514,191 B2 | 12/2016 | Solheim et al. |
| 9,542,440 B2 | 1/2017 | Wang et al. |
| 9,576,007 B1* | 2/2017 | Sivathanu .......... G06F 16/22 |
| 11,308,456 B2 | 4/2022 | Beyer et al. |
| 11,308,919 B2 | 4/2022 | Morris et al. |
| 2001/0034859 A1 | 10/2001 | Swoboda et al. |
| 2002/0038299 A1 | 3/2002 | Zernik et al. |
| 2002/0091736 A1 | 7/2002 | Wall |
| 2002/0169759 A1 | 11/2002 | Kraft et al. |
| 2003/0025692 A1 | 2/2003 | Lu et al. |
| 2003/0071814 A1 | 4/2003 | Jou et al. |
| 2003/0115271 A1 | 6/2003 | Weissman |
| 2004/0103088 A1 | 5/2004 | Cragun et al. |
| 2004/0255237 A1 | 12/2004 | Tong |
| 2004/0267736 A1 | 12/2004 | Yamane et al. |
| 2005/0076240 A1 | 4/2005 | Appelman |
| 2005/0076241 A1 | 4/2005 | Appelman |
| 2005/0201535 A1 | 9/2005 | LaLonde |
| 2005/0203929 A1 | 9/2005 | Hazarika |
| 2005/0246420 A1 | 11/2005 | Little |
| 2005/0278321 A1 | 12/2005 | Vailaya et al. |
| 2005/0278325 A1 | 12/2005 | Mihalcea et al. |
| 2006/0004892 A1 | 1/2006 | Lunt et al. |
| 2006/0074883 A1 | 4/2006 | Teevan et al. |
| 2006/0123014 A1 | 6/2006 | Ng |
| 2006/0168036 A1 | 7/2006 | Schultz |
| 2006/0294085 A1 | 12/2006 | Rose et al. |
| 2007/0162443 A1 | 7/2007 | Liu et al. |
| 2007/0192306 A1* | 8/2007 | Papakonstantinou ........................ |
| | | G06F 16/951 |
| | | 707/999.005 |
| 2007/0208751 A1 | 9/2007 | Cowan et al. |
| 2008/0005064 A1 | 1/2008 | Sarukkai |
| 2008/0010337 A1 | 1/2008 | Hayes |
| 2008/0010350 A1 | 1/2008 | Chen et al. |
| 2008/0016053 A1 | 1/2008 | Frieden et al. |
| 2008/0086344 A1 | 4/2008 | Martini et al. |
| 2008/0091549 A1 | 4/2008 | Chang et al. |
| 2008/0097968 A1 | 4/2008 | Delgado et al. |
| 2009/0049053 A1 | 2/2009 | Barker et al. |
| 2009/0094233 A1 | 4/2009 | Marvit et al. |
| 2009/0125560 A1 | 5/2009 | Munekuni et al. |
| 2009/0132490 A1 | 5/2009 | Okraglik |
| 2009/0132516 A1 | 5/2009 | Patel et al. |
| 2009/0150866 A1 | 6/2009 | Schmidt |
| 2009/0182727 A1 | 7/2009 | Majko |
| 2009/0256678 A1 | 10/2009 | Ryu |
| 2009/0313295 A1 | 12/2009 | Blaxland et al. |
| 2009/0327271 A1 | 12/2009 | Amitay et al. |
| 2010/0063878 A1 | 3/2010 | Bachet et al. |
| 2010/0082695 A1 | 4/2010 | Hardt |
| 2010/0083151 A1 | 4/2010 | Lanza et al. |
| 2010/0169320 A1 | 7/2010 | Patnam et al. |
| 2010/0169326 A1 | 7/2010 | Ma et al. |
| 2010/0179874 A1 | 7/2010 | Higgins et al. |
| 2010/0185610 A1 | 7/2010 | Lunt et al. |
| 2010/0223266 A1* | 9/2010 | Balmin .......... G06F 16/24578 |
| | | 707/E17.014 |
| 2010/0268703 A1 | 10/2010 | Buck |
| 2010/0306185 A1 | 12/2010 | Smith |
| 2010/0332330 A1 | 12/2010 | Goel et al. |
| 2011/0004831 A1 | 1/2011 | Steinberg et al. |
| 2011/0040617 A1 | 2/2011 | Moonka et al. |
| 2011/0055241 A1 | 3/2011 | Lewis |
| 2011/0060803 A1 | 3/2011 | Barlin et al. |
| 2011/0087644 A1 | 4/2011 | Frieden et al. |
| 2011/0099167 A1* | 4/2011 | Galbreath .......... H04L 65/403 |
| | | 707/E17.014 |
| 2011/0145275 A1 | 6/2011 | Stewart |
| 2011/0145719 A1 | 6/2011 | Chen et al. |
| 2011/0153619 A1 | 6/2011 | Carter et al. |
| 2011/0214046 A1 | 9/2011 | Haberman et al. |
| 2011/0218946 A1 | 9/2011 | Stern et al. |
| 2011/0231381 A1 | 9/2011 | Mercuri |
| 2011/0264737 A1 | 10/2011 | Skinner |
| 2011/0271224 A1 | 11/2011 | Cruz Moreno et al. |
| 2012/0030169 A1 | 2/2012 | Allen et al. |
| 2012/0047114 A1 | 2/2012 | Duan et al. |
| 2012/0054303 A1 | 3/2012 | Priyadarshan et al. |
| 2012/0066618 A1 | 3/2012 | Barker et al. |
| 2012/0076367 A1 | 3/2012 | Tseng |
| 2012/0078896 A1 | 3/2012 | Nixon et al. |
| 2012/0079004 A1 | 3/2012 | Herman |
| 2012/0084291 A1 | 4/2012 | Chung |
| 2012/0124041 A1 | 5/2012 | Bawri et al. |
| 2012/0158720 A1 | 6/2012 | Luan et al. |
| 2012/0158791 A1 | 6/2012 | Kasneci et al. |
| 2012/0167010 A1 | 6/2012 | Campbell et al. |
| 2012/0209859 A1 | 8/2012 | Blount |
| 2012/0209878 A1 | 8/2012 | Park et al. |
| 2012/0210240 A1 | 8/2012 | Neystadt et al. |
| 2012/0215771 A1 | 8/2012 | Steiner |
| 2012/0215773 A1 | 8/2012 | Si et al. |
| 2012/0221558 A1 | 8/2012 | Byrne et al. |
| 2012/0221566 A1 | 8/2012 | Iwasa et al. |
| 2012/0239618 A1 | 9/2012 | Kung |
| 2012/0254790 A1 | 10/2012 | Colombino et al. |
| 2012/0271807 A1 | 10/2012 | Smyth et al. |
| 2012/0290399 A1 | 11/2012 | England et al. |
| 2012/0290637 A1 | 11/2012 | Perantatos et al. |
| 2012/0296918 A1 | 11/2012 | Morris et al. |
| 2012/0304215 A1 | 11/2012 | McCarthy et al. |
| 2012/0310922 A1 | 12/2012 | Johnson et al. |

(56) References Cited

U.S. PATENT DOCUMENTS

| | | |
|---|---|---|
| 2012/0311139 A1 | 12/2012 | Brave et al. |
| 2012/0323998 A1 | 12/2012 | Schoen et al. |
| 2012/0324002 A1 | 12/2012 | Chen |
| 2012/0324027 A1 | 12/2012 | Vaynblat et al. |
| 2012/0330908 A1 | 12/2012 | Stowe et al. |
| 2012/0330992 A1 | 12/2012 | Kanigsberg et al. |
| 2013/0006754 A1 | 1/2013 | Horvitz et al. |
| 2013/0013678 A1 | 1/2013 | Murthy |
| 2013/0031489 A1 | 1/2013 | Gubin et al. |
| 2013/0036230 A1 | 2/2013 | Bakos |
| 2013/0041896 A1 | 2/2013 | Ghani et al. |
| 2013/0054349 A1 | 2/2013 | Ogawa |
| 2013/0073280 A1 | 3/2013 | O'Neil et al. |
| 2013/0073568 A1 | 3/2013 | Federov et al. |
| 2013/0073632 A1 | 3/2013 | Fedorov et al. |
| 2013/0073979 A1 | 3/2013 | Shepherd et al. |
| 2013/0073983 A1 | 3/2013 | Rasmussen et al. |
| 2013/0080218 A1 | 3/2013 | Reapso |
| 2013/0086057 A1 | 4/2013 | Harrington et al. |
| 2013/0091149 A1 | 4/2013 | Dunn et al. |
| 2013/0097143 A1 | 4/2013 | Shenoy et al. |
| 2013/0097184 A1 | 4/2013 | Berkhin et al. |
| 2013/0103683 A1 | 4/2013 | Haveliwala et al. |
| 2013/0110638 A1 | 5/2013 | Ogawa |
| 2013/0110802 A1 | 5/2013 | Shenoy et al. |
| 2013/0110827 A1 | 5/2013 | Nabar et al. |
| 2013/0110978 A1 | 5/2013 | Gordon et al. |
| 2013/0124257 A1 | 5/2013 | Schubert |
| 2013/0124437 A1 | 5/2013 | Pennacchiotti et al. |
| 2013/0124613 A1 | 5/2013 | Plache et al. |
| 2013/0132138 A1 | 5/2013 | Doganata et al. |
| 2013/0151611 A1 | 6/2013 | Graham et al. |
| 2013/0155068 A1 | 6/2013 | Bier et al. |
| 2013/0159096 A1 | 6/2013 | Santhanagopal et al. |
| 2013/0167059 A1 | 6/2013 | Legris |
| 2013/0191416 A1 | 7/2013 | Lee et al. |
| 2013/0204706 A1 | 8/2013 | Tang et al. |
| 2013/0212081 A1* | 8/2013 | Shenoy ............ G06F 17/30657 707/706 |
| 2013/0218885 A1 | 8/2013 | Satyanarayanan |
| 2013/0218899 A1 | 8/2013 | Raghavan et al. |
| 2013/0227011 A1 | 8/2013 | Sharma et al. |
| 2013/0238449 A1 | 9/2013 | Ferreira et al. |
| 2013/0238587 A1 | 9/2013 | Annau et al. |
| 2013/0238588 A1 | 9/2013 | Annau et al. |
| 2013/0246404 A1 | 9/2013 | Annau et al. |
| 2013/0246405 A1 | 9/2013 | Annau et al. |
| 2013/0246521 A1 | 9/2013 | Schacht et al. |
| 2013/0262588 A1 | 10/2013 | Barak et al. |
| 2013/0268973 A1 | 10/2013 | Archibong et al. |
| 2013/0288715 A1 | 10/2013 | Shieh et al. |
| 2013/0290323 A1 | 10/2013 | Saib |
| 2013/0298084 A1 | 11/2013 | Spivack et al. |
| 2013/0326369 A1 | 12/2013 | Buchanon |
| 2013/0332523 A1 | 12/2013 | Luu |
| 2013/0346329 A1 | 12/2013 | Alib-Bulatao et al. |
| 2014/0007860 A1 | 1/2014 | Lu |
| 2014/0013353 A1 | 1/2014 | Mathur |
| 2014/0032563 A1 | 1/2014 | Lassen et al. |
| 2014/0032664 A1 | 1/2014 | Wookey |
| 2014/0040008 A1 | 2/2014 | Belani et al. |
| 2014/0040244 A1 | 2/2014 | Rubinstein et al. |
| 2014/0040245 A1* | 2/2014 | Rubinstein ............ G06Q 50/01 707/769 |
| 2014/0040246 A1 | 2/2014 | Rubinstein et al. |
| 2014/0040367 A1 | 2/2014 | Lessin et al. |
| 2014/0040370 A1 | 2/2014 | Buhr |
| 2014/0040729 A1 | 2/2014 | Marlow et al. |
| 2014/0041038 A1 | 2/2014 | Lessin et al. |
| 2014/0046982 A1 | 2/2014 | Chan et al. |
| 2014/0074602 A1 | 3/2014 | van Elsas et al. |
| 2014/0074856 A1 | 3/2014 | Rao |
| 2014/0074888 A1 | 3/2014 | Potter et al. |
| 2014/0074934 A1 | 3/2014 | van Hoff et al. |
| 2014/0114986 A1 | 4/2014 | Bierner et al. |
| 2014/0156652 A1 | 6/2014 | Abiola |
| 2014/0164388 A1* | 6/2014 | Zhang ............... G06F 17/30911 707/742 |
| 2014/0173459 A1 | 6/2014 | Gaiser et al. |
| 2014/0181083 A1* | 6/2014 | Macho ................. G06F 16/252 707/769 |
| 2014/0181091 A1 | 6/2014 | Lassen et al. |
| 2014/0188899 A1 | 7/2014 | Whitnah et al. |
| 2014/0189530 A1 | 7/2014 | Anand et al. |
| 2014/0195605 A1 | 7/2014 | Kallayil |
| 2014/0195977 A1 | 7/2014 | Chang et al. |
| 2014/0207860 A1 | 7/2014 | Wang et al. |
| 2014/0208234 A1 | 7/2014 | Amit et al. |
| 2014/0215351 A1 | 7/2014 | Gansca et al. |
| 2014/0229293 A1 | 8/2014 | Huang et al. |
| 2014/0278986 A1 | 9/2014 | Rouse et al. |
| 2014/0280080 A1 | 9/2014 | Solheim et al. |
| 2014/0280108 A1 | 9/2014 | Dunn et al. |
| 2014/0282029 A1 | 9/2014 | Vishria |
| 2014/0324850 A1 | 10/2014 | Magnaghi et al. |
| 2014/0330551 A1 | 11/2014 | Bao et al. |
| 2014/0330809 A1* | 11/2014 | Raina ................. G06F 17/2705 707/722 |
| 2014/0330818 A1* | 11/2014 | Raina ..................... G06Q 30/02 707/723 |
| 2014/0330819 A1* | 11/2014 | Raina ............... G06F 16/24565 707/723 |
| 2014/0337316 A1 | 11/2014 | Abuelsaad et al. |
| 2014/0344288 A1 | 11/2014 | Evans et al. |
| 2014/0351263 A1 | 11/2014 | Mcconnell et al. |
| 2014/0359023 A1 | 12/2014 | Homsany |
| 2015/0039596 A1* | 2/2015 | Stewart ............... G06F 16/9024 707/723 |
| 2015/0039632 A1 | 2/2015 | Leppanen et al. |
| 2015/0046515 A1 | 2/2015 | Pei et al. |
| 2015/0058758 A1 | 2/2015 | Tseng |
| 2015/0067505 A1 | 3/2015 | Metcalf et al. |
| 2015/0081449 A1 | 3/2015 | Ge et al. |
| 2015/0100644 A1 | 4/2015 | Gulik |
| 2015/0106191 A1 | 4/2015 | Ge et al. |
| 2015/0120700 A1 | 4/2015 | Holm et al. |
| 2015/0127677 A1 | 5/2015 | Wang et al. |
| 2015/0142785 A1* | 5/2015 | Roberts .................. G06F 16/35 707/723 |
| 2015/0187024 A1 | 7/2015 | Karatzoglou et al. |
| 2015/0242402 A1 | 8/2015 | Holm et al. |
| 2015/0242473 A1 | 8/2015 | Brugard et al. |
| 2015/0248222 A1 | 9/2015 | Stickler et al. |
| 2015/0248410 A1 | 9/2015 | Stickler et al. |
| 2015/0248480 A1 | 9/2015 | Miller et al. |
| 2015/0249715 A1 | 9/2015 | Helvik et al. |
| 2015/0294138 A1 | 10/2015 | Barak et al. |
| 2015/0363402 A1* | 12/2015 | Jackson ............ G06F 17/30867 707/723 |
| 2015/0363407 A1 | 12/2015 | Huynh et al. |
| 2015/0379586 A1 | 12/2015 | Mooney et al. |
| 2015/0381552 A1 | 12/2015 | Vijay et al. |
| 2016/0034469 A1 | 2/2016 | Livingston et al. |
| 2016/0070764 A1 | 3/2016 | Helvik et al. |
| 2016/0117740 A1 | 4/2016 | Linden et al. |
| 2016/0203510 A1 | 7/2016 | Pregueiro et al. |
| 2017/0072002 A1 | 3/2017 | Bafundo et al. |
| 2017/0091644 A1 | 3/2017 | Chung et al. |
| 2017/0212931 A1* | 7/2017 | Chen ................. G06F 16/24544 |
| 2019/0180204 A1 | 6/2019 | Stickler et al. |
| 2020/0358864 A1 | 11/2020 | Helvik et al. |
| 2021/0056472 A1 | 2/2021 | Stickler et al. |
| 2021/0232631 A1 | 7/2021 | Holm et al. |
| 2021/0263917 A1 | 8/2021 | Helvik et al. |
| 2022/0222249 A1 | 7/2022 | Holm et al. |

FOREIGN PATENT DOCUMENTS

| | | |
|---|---|---|
| CN | 102150161 A | 8/2011 |
| CN | 102298612 A | 12/2011 |
| CN | 102567326 A | 7/2012 |
| CN | 102693251 A | 9/2012 |
| CN | 102708168 A | 10/2012 |

(56) References Cited

FOREIGN PATENT DOCUMENTS

| CN | 102906689 A | 1/2013 |
|---|---|---|
| CN | 102930035 A | 2/2013 |
| EP | 2409271 A2 | 1/2012 |
| EP | 2426634 A1 | 3/2012 |
| EP | 2764489 A1 | 8/2014 |
| WO | 2008097969 A2 | 8/2008 |
| WO | 2008/111087 A2 | 9/2008 |
| WO | 2010/029410 A1 | 3/2010 |
| WO | 2012129400 A2 | 9/2012 |
| WO | 2013/026095 A1 | 2/2013 |
| WO | 2013/043654 A2 | 3/2013 |
| WO | 2013/123550 A1 | 8/2013 |
| WO | 2013/173232 A1 | 11/2013 |

OTHER PUBLICATIONS

"Non Final Office Action Issued in U.S. Appl. No. 16/938,065", dated May 10, 2022, 20 Pages.

"Non Final Office Action Issued in U.S. Appl. No. 17/317,969", dated Apr. 22, 2022, 14 Pages.

"Notice of Allowance Issued in U.S. Appl. No. 16/275,386", dated Mar. 6, 2020, 10 Pages.

Oyama., et al., "Analysis of Topics and Relevant Documents for Navigational Retrieval on the Web", In Proceedings of International Workshop on Challenges in Web Information Retrieval and Integration, Apr. 8, 2005, 6 Pages.

Chen, et al., "Towards Topic Trend Prediction on a Topic Evolution Model with Social Connection", In Proceedings of ACM International Conferences on Web Intelligence and Intelligent Agent Technology, Dec. 4, 2012, 5 Pages.

"Final Office Action Issued in U.S. Appl. No. 14/192,235", dated Jul. 25, 2019, 14 Pages.

"Non Final Office Action Issued in U.S. Appl. No. 16/275,386", dated Aug. 29, 2019, 36 Pages.

European Office Action in Application 15710653.5, dated Jul. 27, 2017, 8 pages.

Roth, et al., "Suggesting Friends Using the Implicit Social Graph", In Proceedings of the 16th ACM SIGKDD International Conference on Knowledge Discovery and Data Mining, Jul. 25, 2010, 9 pages.

Kubica, et al., "cGraph: A Fast Graph-Based Method for Link Analysis and Queries", In Proceedings of the IJCAI Text-Mining & Link-Analysis Workshop, Aug. 2003, 10 pages.

Khodaei, et al., "Social-Textual Search and Ranking", In Proceedings of the First International Workshop on Crowdsourcing Web Search, Apr. 17, 2012, 6 pages.

Elbassuoni, et al., "Language-Model-Based Ranking for Queries on RDF-Graphs", In Proceedings of the 18th ACM Conference on Information and Knowledge Management, Nov. 2, 2009, 10 pages.

Diaz, et al., "SIGIR 2013 Workshop on Time Aware Information Access (#TAIA2013)", In Proceedings of the 36th International ACM SIGIR Conference on Research and Development in Information Retrieval, Aug. 1, 2013, 41 pages.

U.S. Appl. No. 14/070,734 , Wang, et al., "Querying an Enterprise Graph Index", filed Nov. 4, 2013.

Vikjord, et al., "Using Enterprise Signals to Generate People Relationships and Promote Content", unfiled US Patent Application.

"Final Office Action Issued in U.S. Appl. No. 14/192,235", dated Nov. 18, 2020, 17 Pages.

"Notice of Allowance Issued in U.S. Appl. No. 14/192,235", dated Sep. 1, 2022, 17 Pages.

"Final Office Action Issued in U.S. Appl. No. 16/895,056", dated Jul. 28, 2022, 18 Pages.

"Final Office Action Issued in U.S. Appl. No. 16/938,065", dated Aug. 16, 2022, 23 Pages.

"Final Office Action Issued in U.S. Appl. No. 15/833,453", dated May 4, 2020, 30 Pages.

"Non Final Office Action Issued in U.S. Appl. No. 14/192,235", dated Aug. 20, 2021, 17 Pages.

"Notice of Allowance Issued in U.S. Appl. No. 16/895,056", dated Sep. 20, 2021, 11 Pages.

Pang, et al., "Association-Based Recommendation of Web Information", In Proceedings of International Conference on Systems, Man and Cybernetics, vol. 7, Oct. 6, 2002, 5 Pages.

Tran, et al., "User Interest Analysis with Hidden Topic in News Recommendation System", In Proceedings of International Conference on Asian Language Processing, Dec. 28, 2010, 4 Pages.

"First Examination Report Issued in Indian Patent Application No. 201647027554", dated Sep. 14, 2020, 3 Pages.

"Second Office Action and Search Report Issued in Chinese Patent Application No. 201480058874.0", dated Jun. 26, 2019, 14 Pages.

"Final Office Action Issued in U.S. Appl. No. 14/064,393", dated Mar. 4, 2019, 19 Pages.

"Notice of Allowance Issued in U.S. Appl. No. 14/194,700", dated Apr. 15, 2020, 9 Pages.

"Non Final Office Action Issued in U.S. Appl. No. 14/192,235", dated Apr. 17, 2020, 16 Pages.

PCT International Preliminary Report on Patentability Issued In Application No. PCT/US2016/012399, dated Jul. 11, 2017, 9 Pages.

"Notice of Allowance Issued in U.S. Appl. No. 16/895,056", dated Aug. 5, 2021, 11 Pages.

Aiello, et al., "Sensing Trending Topics in Twitter", In Journal of IEEE Transactions on Multimedia, vol. 15, Issue 6, Oct. 1, 2013, pp. 1268-1282.

Kim, et al., "Evolution of Social Networks Based on Tagging Practices", In Journal of IEEE Computer Society, vol. 6, Issue 2, Apr. 1, 2013, pp. 252-261.

"Non Final Office Action Issued in U.S. Appl. No. 14/192,235", dated Dec. 26, 2018, 16 Pages.

"Final Office Action Issued in U.S. Appl. No. 14/593,650", dated Jan. 4, 2019, 35 Pages.

"Non Final Office Action Issued in U.S. Appl. No. 16/057,229", dated Jun. 9, 2020, 8 Pages.

"Final Office Action Issued In U.S. Appl. No. 14/064,393", dated Jun. 12, 2020, 27 Pages.

"Office Action Issued in Mexican Patent Application No. MX/a/2017/002699", dated Feb. 14, 2020, 7 Pages.

"Office Action and Search Report Issued in Chinese Patent Application No. 201580047507.5", dated Apr. 3, 2020, 13 Pages.

"Second Office Action issued in Chinese Patent Application No. 201580011895.1", dated Aug. 9, 2019, 6 Pages.

"Advisory Action Issued in U.S. Appl. No. 14/064,393", dated Jun. 6, 2019, 6 Pages.

"Second Office Action Issued in Chinese Patent Application No. 201580010703.5", dated Oct. 24, 2019, 5 Pages.

"Final Office Action Issued in U.S. Appl. No. 14/194,700", dated May 20, 2019, 25 Pages.

"Notice of Allowance Issued in U.S. Appl. No. 14/195,243", dated May 1, 2019, 10 Pages.

Bakhshandeh, et al., "Personalized Search Based on Micro-Blogging Social Networks", In Proceedings of the CSI International Symposium on Artificial Intelligence and Signal Processing, May 2, 2012, 4 Pages.

Mishra, et al., "Improving Mobile Search through Location Based Context and Personalization", In Proceedings of the International Conference on Communication Systems and Network Technologies, May 11, 2012, 5 Pages.

"Non Final Office Action Issued in U.S. Appl. No. 15/833,453", dated Sep. 11, 2020, 36 Pages.

Pradel, et al., "Natural Language Query Interpretation into SPARQL using Patterns", Retrieved From: https://hal.archives-ouvertes.fr/hal-01143219/document, Oct. 22, 2013, 14 Pages.

Brinkley, et al., "A Query Integrator and Manager for the Query Web", In Journal of Biomedical Informatics, vol. 45, Issue 5, Oct. 1, 2012, pp. 975-991.

"Office Action Issued in Chinese Patent Application No. 201580047507.5", dated Sep. 28, 2020, 14 Pages.

"Non-Final Office Action Issued in U.S. Appl. No. 14/064,393", dated Sep. 26, 2019, 20 Pages.

"Non Final Office Action Issued in U.S. Appl. No. 14/194,700", dated Nov. 5, 2019, 27 Pages.

(56) References Cited

OTHER PUBLICATIONS

"Non Final Office Action Issued in U.S. Appl. No. 15/833,453", dated Dec. 17, 2019, 42 Pages.
Yong Yin at al., An improved Search Strategy for Even Degree Distribution Networks, Jul. 2013, Academy Publisher, vol. 8, No. 7, pp. 1558-1565 (Year: 2013).
Jason J. Jung, Understanding information propagation on online social tagging systems, Nov. 4, 2012, Springer Science+ Business Media, Edition or vol. 48, pp. 745-754 (Year: 2012).
Barbie E. Keiser, Semisocial information Discovery, Novi Dec. 2013, Online searcher, pp. 16-22 (Year: 2013).
Anthony Stefanidis et al., Harvesting ambient geospatial information from social media feeds, Dec. 4, 2011, GeoJournal, Edition or vol. 78, pp. 319-338 (Year: 2011).
"First Office Action & Search Report Issued in Chinese Patent Application No. 201480058874.0", dated Dec. 5, 2018, 14 Pages.
"Bing Ads targeting—training", Published on: Mar. 31, 2013 Available at: http://advertise.bingads.microsoft.com/en-ca/cl/245/training/bing-ads-targeting.
"Campaign Element Template Parameters—Training", Retrieved on: Oct. 1, 2014 Available at: https://www-304.ibm.com/support/knowledgecenter/SSZLC2_7.0.0/com.ibm.commerce.management-center_customization.doc/concepts/csbcustargdef.htm.
"Connections Enterprise Content Edition", Published on: Nov. 22, 2013 Available at: http://www-03.ibm.com/software/products/en/connections-ecm/.
"Enterprise Search from Microsoft", Published on: Jan. 2007, Available at: https://www.google.co.in/url?sa=t&rct=j&q=&esrc=s&source=web&cd=2&cad=rja&ved=0CDMQFjAB&url=http%3A%F%2Fdownload.microsoft.com%2Fdownload%2Fd%2F0%2F1%2Fd0165e6d-11cb-464b-b24a-c019d82def0d%2FEnterprise%2520Search%2520from%2520Microsoft.doc&ei=IAq9UqueHoTtrAe5yoC4Bg&usg=AFQjCNEax9yYC0KGTUhr4bNIxTJpyyyhsA&bvm=bv.58187178,d.bmk.
"Facets for Enterprise Search Collections", Retrieved on: Jun. 17, 2014, Available at: http://pic.dhe.ibm.com/infocenter/analytic/v3r0m0/index.jsp?topic=%2Fcom.icm.discovery.es.ad.doc%2Fiiysafacets.htm.
"Getting Started with your My Site", Published on: Apr. 6, 2013, Available at: http://office.microsoft.com/en-in/sharepoint-server-help/getting-started-with-your-my-site-HA101665444.aspx.
"How to Segment and Target Your Emails—Training", Published on: Aug. 15, 2014 Available at: http://www.marketo.com/_assets/uploads/How-to-Segment-and-Target-Your-Emails.pdf?20130828153321.
"Introducing Delve (codename Oslo) and the Office Graph", Published on: Mar. 11, 2014, Available at: http://blogs.office.com/2014/03/11/introducing-codename-oslo-and-the-office-graph/.
"Introduction to Managed Metadata", Retrieved on: Jun. 23, 2014 Available at: http://office.microsoft.com/en-001/office365-sharepoint-online-enterprise-help/introduction-to-managed-metadata-HA102832521.aspx.
"Persistent Search: Search's Next Big Battleground", Available at: http://billburnham.blogs.com/burnhamsbeat/2006/04/persistent_sear.html, Published on: Apr. 10, 2006, 3 pages.
"Turn search history off or on", retrieved from http://onlinehelp.microsoft.com/en-US/bing/ff808483.aspx, Retrieved date: Dec. 12, 2013, 1 page.
"Yammer the Enterprise Social Network", Published on: Sep. 9, 2013 Available at: https://about.yammer.com/product/feature-list/.
Amitay et al., "Social Search and Discovery using a Unified Approach", In Proceedings of the 20th ACM Conference on Hypertext and Hypermedia, Jun. 29, 2009, pp. 199-208.
Bailly, Nestor, "Finding the Best Video Content Using the Power of the Social Graph", Published on: Jul. 17, 2013 Available at: http://iq.intel.com/iq/35820000/finding-the-best-video-content-using-the-power-of-the-social-graph.
Bobadilla et al., "Recommender Systems Survey", In Journal of Knowledge-Based Systems, vol. 46, Jul. 2013, pp. 109-132.
Daly et al., "Social Lens: Personalization around user Defined Collections for Filtering Enterprise Message Streams", In Proceedings of the Fifth International AAAI Conference on Weblogs and Social Media, Published on: Jul. 17, 2011, 8 pages.
Fan et al., "Tuning Before Feedback: Combining Ranking Discovery and Blind Feedback for Robust Retrieval", Retrieved at http://filebox.vt.edu/users/wfan/paper/ARRANGER/p52-Fan.pdf, 27th Annual International ACM SIGIR Conference on Research and Development in Information Retrieval, Jul. 25, 2004, 8 pages.
Fazio, Stephanie, "How Social is Enterprise Search?", Published on: Mar. 14, 2012, Available at: http://blogs.opentext.com/vca/blog/1.11.647/article/1.26.2007/2012/3/14/How_Social_is_Enterprise_Search%3F.
Fox, Vanessa, "Marketing in the Age of Google", John Wiley & Sons, Mar. 8, 2012, 3 pages.
Giugno et al., "GraphGrep: A Fast and Universal Method for Querying Graphs", In Proceedings of the 16th International Conference on Pattern Recognition, vol. 2, Aug. 11, 2002, 4 pages.
Gruhl et al., "The Web beyond Popularity—A Really Simple System for Web Scale RSS", In Proceedings of the 15th International Conference on World Wide Web, May 23, 2006, pp. 183-192.
Guy et al., "Finger on the Pulse: The Value of the Activity Stream in the Enterprise", In Proceedings of 14th IFIP TC 13 International Conference on Human-Computer Interaction, Sep. 2, 2013, 18 pages.
Guy et al., "Personalized Recommendation of Social Software Items Based on Social Relations", In Proceedings of the Third ACM Conference on Recommender Systems, Oct. 2009, pp. 53-60.
Hackett, Wes, "Extending the Activity Feed with Enterprise Content", In Proceedings of ActivityFeed, Development, Featured, Sharepoint, Social Features, Jun. 16, 2011, 27 pages.
Hanada, Tetsuya, "Yammer—Enterprise Graph SharePoint", In Australian Sharepoint Conference, Jun. 11, 2013, 23 pages.
Josh, "Send Notifications to your Customers in their Timezone—training", Published on: Aug. 19, 2014 Available at: https://mixpanel.com/blog/2014/08/19/announcement-send-notifications-in-your-customer-s-timezone.
Kelly et al., "The Effects of Topic Familiarity on Information Search Behavior", Retrieved at http://www.ils.unc.edu/~dianek/kelly-jcd102.pdf, Joint Conference on Digital Libraries, Portland, Oregon, USA, Jul. 13, 2002, 2 pages.
Li et al., "Personalized Feed Recommendation Service for Social Networks", In IEEE 2nd International Conference on Social Computing, Aug. 20, 2010, 8 pages.
Li et al., "Research of Information Recommendation System Based on Reading Behavior", In International Conference on Machine Learning and Cybernetics, vol. 3, Jul. 12, 2008, 6 pages.
Liang et al., "Highlighting in Information Visualization: A Survey", In Proceedings of 14th International Conference Information Visualisation, Jul. 26, 2010, pp. 79-85.
Masuch, Lukas, "Hack: Enterprise Knowledge Graph—One Graph to Connect them All,", Published on: Mar. 28, 2014, Available at: http://www.managementexchange.com/hack/enterprise-knowledge-graph-one-graph-connect-them-all.
Muralidharan et al., "Social Annotations in Web Search", In Proceedings of the ACM Annual Conference on Human Factors in Computing Systems, May 5, 2012, 10 pages.
Pecovnik, Simon, "Enterprise Graph Search—take 1", Published on: Jan. 28, 2014, Available at: http://www.ravn.co.uk/2014/01/28/enterprise-graph-search/.
Perer et al., "Visual Social Network Analytics for Relationship Discovery in the Enterprise", In IEEE Conference on Visual Analytics Science and Technology, Published on: Oct. 23, 2011, 9 pages.
Ronen et al., "Social Networks and Discovery in the Enterprise (SaND)", In Proceedings of the 32nd International ACM SIGIR Conference on Research and Development in Information Retrieval, Jul. 19, 2009, 1 page.
Soussi, Rania, "Querying and Extracting Heterogeneous Graphs from Structured Data and Unstructured Content", In Doctoral Dissertation, Ecole Centrale Paris, Jun. 22, 2012, 208 pages (1 page Abstract).

(56) References Cited

OTHER PUBLICATIONS

Ubbesen, Christian, "Enterprise Graph Search", Published on: Jan. 28, 2013, Available at: http://www.findwise.com/blog/enterprise-graph-search/.

Yap, Jamie, "Graph Search Capabilities Offer Enterprise Benefits", Published on: Feb. 14, 2013, Available at: http://www.zdnet.com/graph-search-capabilities-offer-enterprise-benefits-7000011304/.

Yeung, Ken, "Yammer Unveils the Open Graph for the Enterprise, to Help make Business Apps More Social", Published on: Oct. 29, 2012, Available at: http://thenextweb.com/insider/2012/10/29/yammer-using-the-enterprise-graph/?utm_source=feedburner&utm_medium=feed&utm_campaign=Feed:+TheNextWeb+(The+Next+Web+All+Stories).

Zhibao et al., "EISI: An Extensible Security Enterprise Search System", In 2nd International Conference on Computer Science and Network Technology, Dec. 29, 2012, pp. 896-900.

"8 Things Marketers Ought to Know About Facebooks New Trending Feature", Retrieved from: https://web.archive.org/save/https://www.facebook.com/notes/brandlogist/8-things-marketers-ought-to-know-about-facebooks-new-trending-feature/650859898308191/, Jan. 30, 2014, 5 Pages.

"Trending—Definition and Synonyms", Retrieved from: https://web.archive.org/web/20170618063522/http://www.macmillandictionary.com:80/US/dictionary/american/trending, Jul. 18, 2014, 1 Page.

Dayal, Priyanka, "How Many Tweets Make a Trend?", Retrieved from: https://www.vuelio.com/uk/blog/how-many-tweets-make-a-trend/. Aug. 28, 2013, 5 Pages.

"Office Action Issued in Chinese Patent Application No. 201580047507.5", dated Jan. 11, 2021, 11 Pages.

Resnick, "Request for Comments: 5322", Network Working Group, Qualcomm Incorporated, 57 pages (Oct. 2008).

"First Office Action and Search Report Issued in Chinese Patent Application No. 201580011895.1", dated Mar. 5, 2019, 18 Pages.

"Office Action Issued in European Patent Application No. 15710632.9", dated Feb. 18, 2019, 07 Pages.

"First Office Action and Search Report Issued in Chinese Patent Application No. 201580010703.5", dated Mar. 8, 2019, 12 Pages.

"Notice of Allowance Issued in U.S. Appl. No. 14/192,235", dated Mar. 23, 2022, 20 Pages.

"Non-Final Office Action Issued in U.S. Appl. No. 16/895,056", dated Feb. 2, 2022, 17 Pages.

"Office Action Issued in European Patent Application No. 15771764.6", dated May 13, 2019, 9 Pages.

"Notice of Allowance Issued in U.S. Appl. No. 16/895,056", dated Feb. 1, 2023, 11 Pages.

Melenhorst, et al., "Usefulness of Tags in Providing Access to Large Information Systems", In Proceeding of the 2007 IEEE International Professional Communication Conference, Oct. 1, 2007, 9 Pages.

\* cited by examiner

RANKING ENTERPRISE GRAPH QUERIES

CROSS-REFERENCE TO RELATED APPLICATION

The present application is based on and claims the benefit of U.S. provisional patent application Ser. No. 61/935,680, filed Feb. 2, 2014, the content of which is hereby incorporated by reference in its entirety.

BACKGROUND

Computer systems are currently in wide use. Many computer systems are used by relatively large organizations, such as enterprise organizations.

Enterprise organizations can employ a large number of people, and they can utilize a large volume of content. Because of the large number of employees at a given company, and because of the large volume of data that can be used by the company, it can be difficult for individuals to find data that they are looking for within the organization. Such data can be stored in a conventional data store. Conventional search techniques can be used, but they often do not provide adequate mechanisms for identifying relevant data.

The discussion above is merely provided for general background information and is not intended to be used as an aid in determining the scope of the claimed subject matter.

SUMMARY

A graph query is executed against a graph index that connects actors with objects through edges. A graph ranking model is obtained and results of the graph query are ranked, using the graph ranking model, based upon edge data available from edges in the graph that match the query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
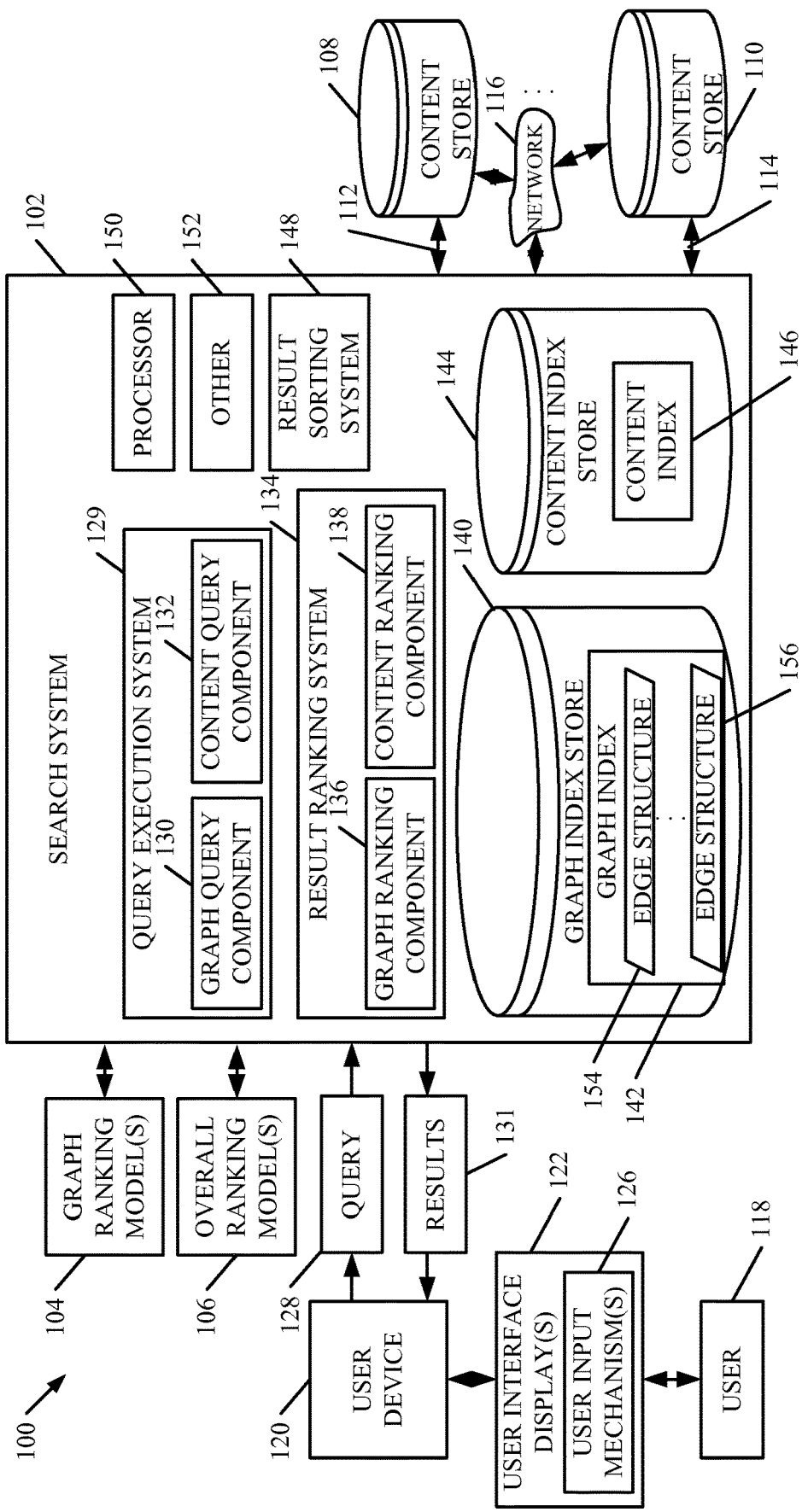
FIG. 1 is a block diagram of one illustrative search architecture.

FIG. 1 is a block diagram of one illustrative search architecture 100. Architecture 100 shows search system 102 that has access to a set of graph ranking models 104 and overall ranking models 106. System 102 also illustratively has access to content that can be stored in content stores 108 and 110 (or other content stores). System 102 can have access to content stores 108 and 110 either directly, as indicated by arrows 112 and 114, or over network 116. Architecture 100 also shows that user 118 can access search system 102, either using a user device 120, or directly. In either case, user interface displays 122 are illustratively generated, along with user input mechanisms 126. User 118 can interact with user input mechanisms 126 in order to control and manipulate search system 102. In one embodiment, for instance, user 118 can provide query 128 and receive search results 131.

The present discussion proceeds with respect to a query having two separate portions: a graph query portion and a content query portion. However, this is only one example. It will be noted that the two portions can be in separate queries or encapsulated into a single query expression. Also, the present discussion proceeds with respect to the graph query and content query portions being processed by separate components (like separate query execution components and ranking components). However, this is only one example. The components can be combined as well, and the present discussion proceeds with respect to separate components by way of example only.

Search system 102, itself, illustratively includes query execution system 129 (which can include graph query component 130 and content query component 132), result ranking system 134 (which includes graph ranking component 136 and content ranking component 138), graph index store 140 that includes graph index 142, content index store 144 that includes content index 146, result sorting system 148, processor 150, and it can include other items 152 as well.

Graph index 142 illustratively includes a set of edge structures 154-156. It will be noted that, while only two edge structures 154 and 156 are shown, graph index 142 illustratively includes additional edge structures as well. Before describing the overall operation of the search architecture 100 shown in FIG. 1, a number of the items shown in FIG. 1 will first be described.

Figure 2:
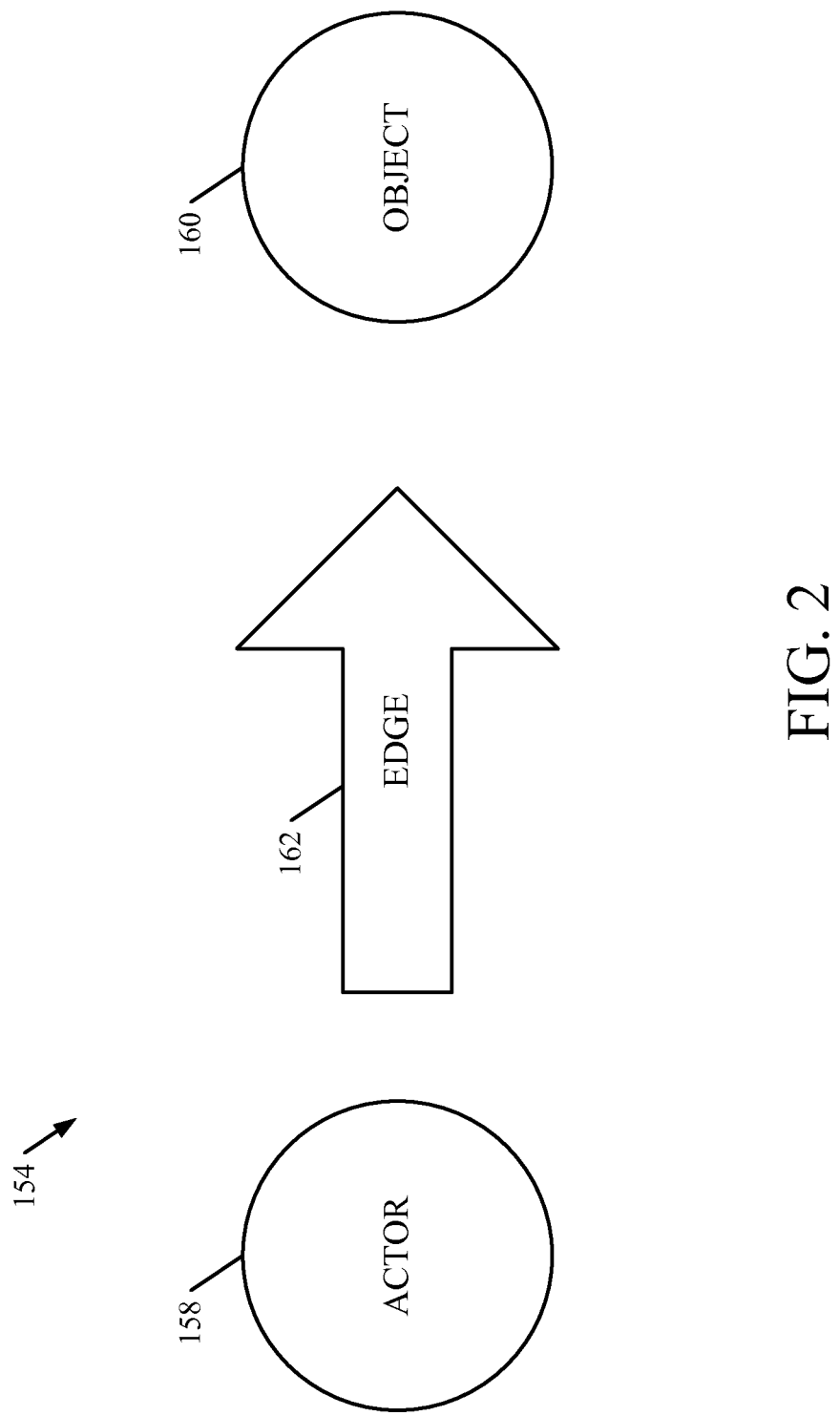
FIG. 2 illustrates one embodiment of a graph structure.

FIG. 2 shows one illustrative embodiment of an edge structure (such as edge structure 154 shown in FIG. 1). It can be seen that edge structure 154 illustratively includes actor 158 and object 160. The actor and object are connected to one another by edge 162. Actor 158 can be any item or entity that is identified with a separate identifier in system 100. Object 160, like actor 158, can also be any item or entity that is identified by its own identifier. Actors 158 and objects 160 can, for instance, be people, documents, groups, customers, presentations, resources, images, spreadsheets, or a wide variety of other items or entities.

Figure 3:
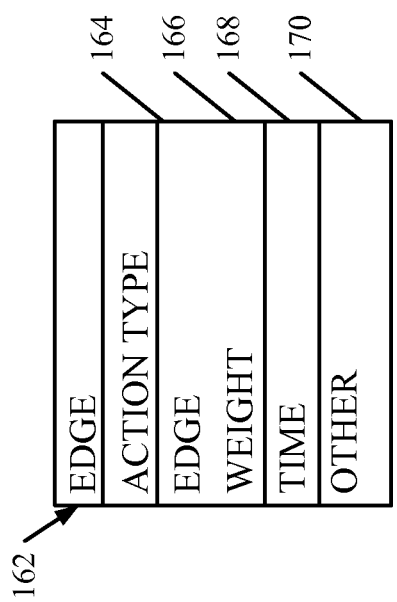
FIG. 3 shows one embodiment of contents of an edge.

Edge 162 indicates that actor 158 is related to object 160 in some way. They can be related by actions, interactions, or in other ways. Edge 162 not only indicates that actor 158 and object 160 are related, but it also illustratively includes information that identifies the type of relationship. By way of example, FIG. 3 shows one embodiment of edge 162 in more detail. It can be seen in FIG. 3 that edge 162 includes an action type 164, an edge weight 166, a time 168, and it can include other information 170 as well. The action type indicates the type of relationship between actor 158 and object 160 and the edge weight 166 identifies a strength of the relationship identified by action type 164. The weights 166 can also represent the importance of the interaction (of the identified action type) relative to other actions of the same type. The weights can be used in query-time ranking. They can also be calculated beforehand and added to the edges in the graph. Time 168 identifies a temporal relationship between actor 158 and object 160. In one embodiment, time 168 is a time stamp that indicates a most recent time when the action identified by action type 164 was taken with respect to actor 158 and object 160.

As examples, there can be a wide variety of different action types. For instance, if actor 158 is a user and object 160 is a document, then one action type may be "view". If edge 162 included the "view" action type, this would indicate that the user represented by actor 158 had viewed the document represented by object 160. The edge weight 166 would indicate a weight of this "view" action with respect to other actions of the same action type involving actor 158. For example, if the user represented by actor 158 views the document represented by object 160 ten times in a given day, but the user only views another document (represented by a different object) twice in the same day, then the edge weight 166 associated with edge 162 (between actor 158 and object 160) might be higher than the edge weight for the edge that connects actor 158 to the other document. Of course, this is an example only and the edge weight can be determined in other ways as well.

Using the same example (in which the action type is "view") the time information 168 may include a time when actor 158 has most recently viewed the document represented by object 160. This can be used to determine the recency of the action type, and other things as well, as described in greater detail below.

Figure 4:
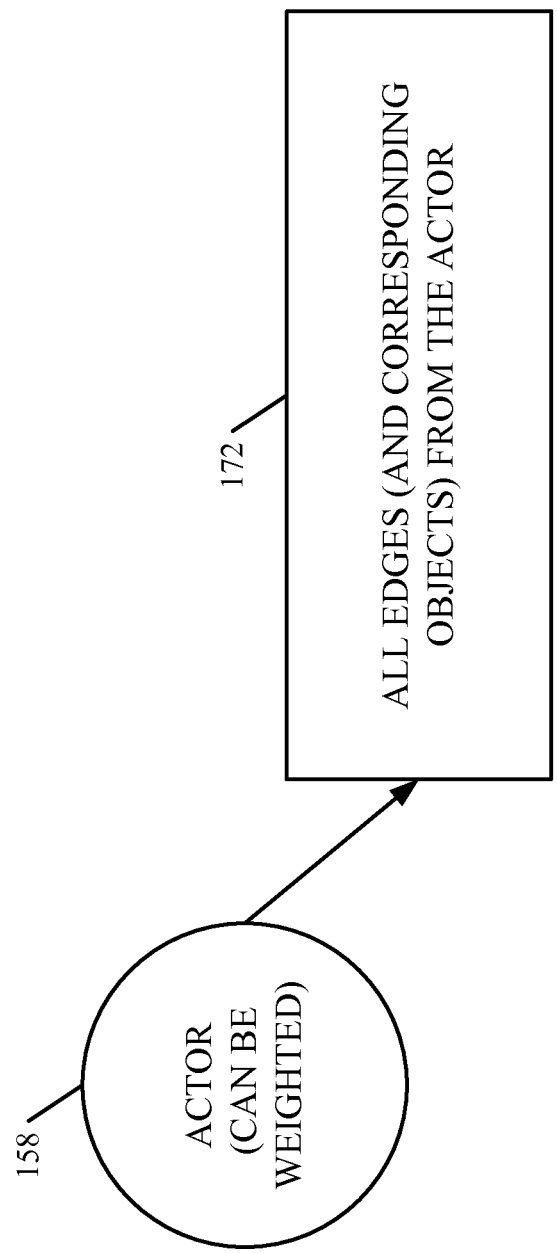
FIG. 4 shows one illustrative implementation of a data store structure for storing a graph.

It will also be appreciated that the edge structures 154-156 can be stored in graph index 142 in a wide variety of different ways. FIG. 4 shows one overall structure that can be used to store the edge structures 154-156. It can be seen in FIG. 4 that, in one embodiment, all edges 172 that have a given actor 158 can be stored together in a single data set in data store 140. For instance, if actor 158 has edges that connect to a plurality of different objects, then all of those edges can be stored together, and can reference actor 158 as the actor in the corresponding edge structure. Thus, if a user searches for a given actor, all of the edges 172 for that actor can easily be identified and retrieved, if desired.

Content index 146, stored in content index store 144, is illustratively a content index that indexes content stored on content stores 108 and 110. The content index 146 can index that information in a wide variety of different ways. For instance, it can index the information based on key words, based on domain, based on author, creation time, or in a wide variety of other ways.

Query execution system 129 illustratively receives query 128 from user 118 and executes that query using graph index 142 and content index 146. By way of example, query 128 may include a content query portion and a graph query portion. If that is the case, graph query component 130 in system 129 executes the graph query portion against graph index 142 and content query component 132 executes the content query portion against content index 146.

Result ranking system 134 includes graph ranking component 136 that accesses a graph ranking model 104. It also includes content ranking component 138 that accesses an overall ranking model 106. When the matching graph query results are returned by graph query component 130, graph ranking component 136 scores and ranks those results using an identified graph ranking model 104. The graph ranking results can be used by content ranking component 138 in ranking the overall results, using an overall ranking model 106. Result sorting system 148 then sorts the results according to rank, and they can be provided as ranked results 131, that are made available to user 118 in response to query 128.

Figure 5:
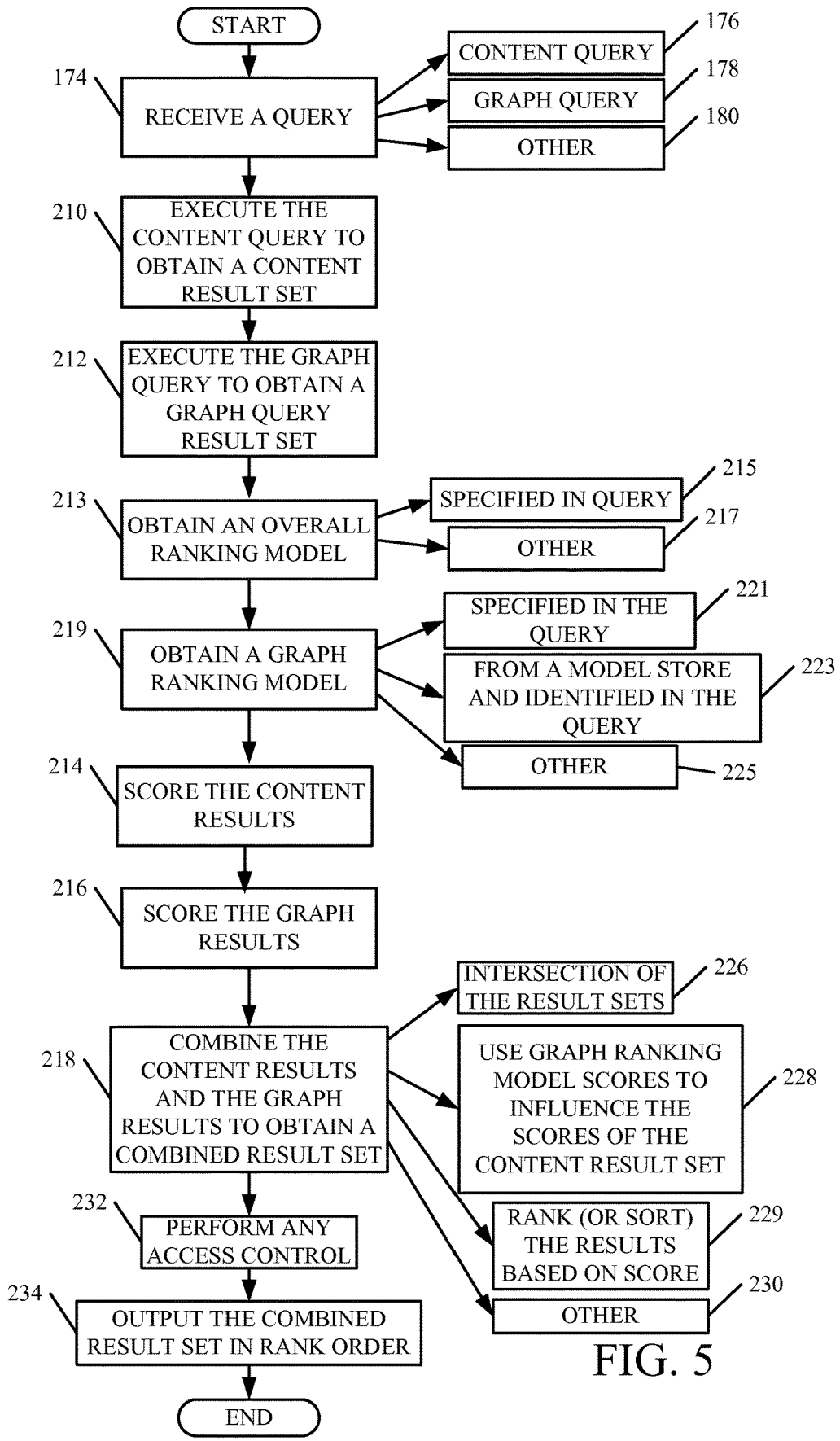
FIG. 5 is a flow diagram illustrating one embodiment of the architecture shown in FIG. 1 in processing a query and ranking query results.

FIG. 5 is a flow diagram illustrating one embodiment of the operation of architecture 100 in more detail. Search system 102 first receives a query 128 that is input by user 118. This is indicated by block 174. As briefly mentioned above, the query 128 can include a content query portion 176, a graph query portion 178, and it can include other information 180 as well.

Figure 6:
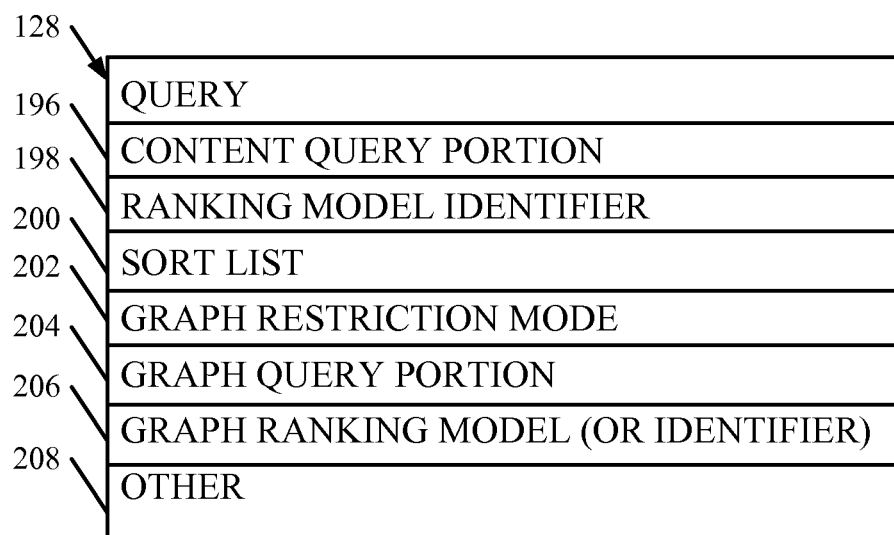
FIG. 6 shows one embodiment of content in a query.

FIG. 6 shows one example of information that can be provided in query 128. FIG. 6 shows that query 128 can include a content query portion 196 that is executed by content query component 132 against content index 148. Query 128 can also include a ranking model identifier 198 that identifies an overall ranking model 106 that is used by content ranking component 138 to rank the overall results. Query 128 also illustratively includes a sort list 200 that indicates to result sorting system 148 how the results are to be sorted and a graph restriction mode 202 that indicates whether only results with matching graph edges are to be returned or whether content results can be returned regardless of whether there is a corresponding graph edge match. Graph query 128 also illustratively includes graph query portion 204 and graph ranking model (or identifier) 206. Graph query portion 204 is executed by graph query component 130 against graph index 142 to identify matching graph edges. Graph ranking model (or identifier) 206 either sets forth a graph ranking model 104 that is to be used to score and rank the matching graph results, or it is an identifier that is to be used to locate the graph ranking model 104 that is to be used for ranking the graph results. Query 128 can include other information 208 as well. Again, it will be noted that the information shown in FIG. 6 is only one example of a query 128.

In any case, once the query 128 is received, content query component 132 executes the content query portion 196 of query 128 against the content index 146 in content index store 144. This is indicated by block 210 in FIG. 5.

Graph query component 130 executes the graph query portion 204 against graph index 142 in graph index store 140. This is indicated by block 212.

Content ranking component 138 then obtains an overall ranking model to rank the overall results that are returned in response to the query. This is indicated by block 213. The overall ranking model can be specified in the query 128, itself. This is indicated by block 215. The overall ranking model can be obtained in other ways as well, and this is indicated by block 217.

Graph ranking component 136 also obtains a graph ranking model 104. This is indicated by block 219. The graph ranking model can also be specified in the query, as indicated by block 221. In another embodiment, graph ranking component 136 can obtain the graph ranking model which is persisted in a store and referenced through an identifier. This is indicated by block 223. The graph ranking model can be obtained in other ways as well, and this is indicated by block 225.

Content ranking component 138 then scores the content results. This is indicated by block 214. Graph ranking component 136 then scores the graph results based upon the identified graph ranking model 104. This is indicated by block 216.

Figure 7:
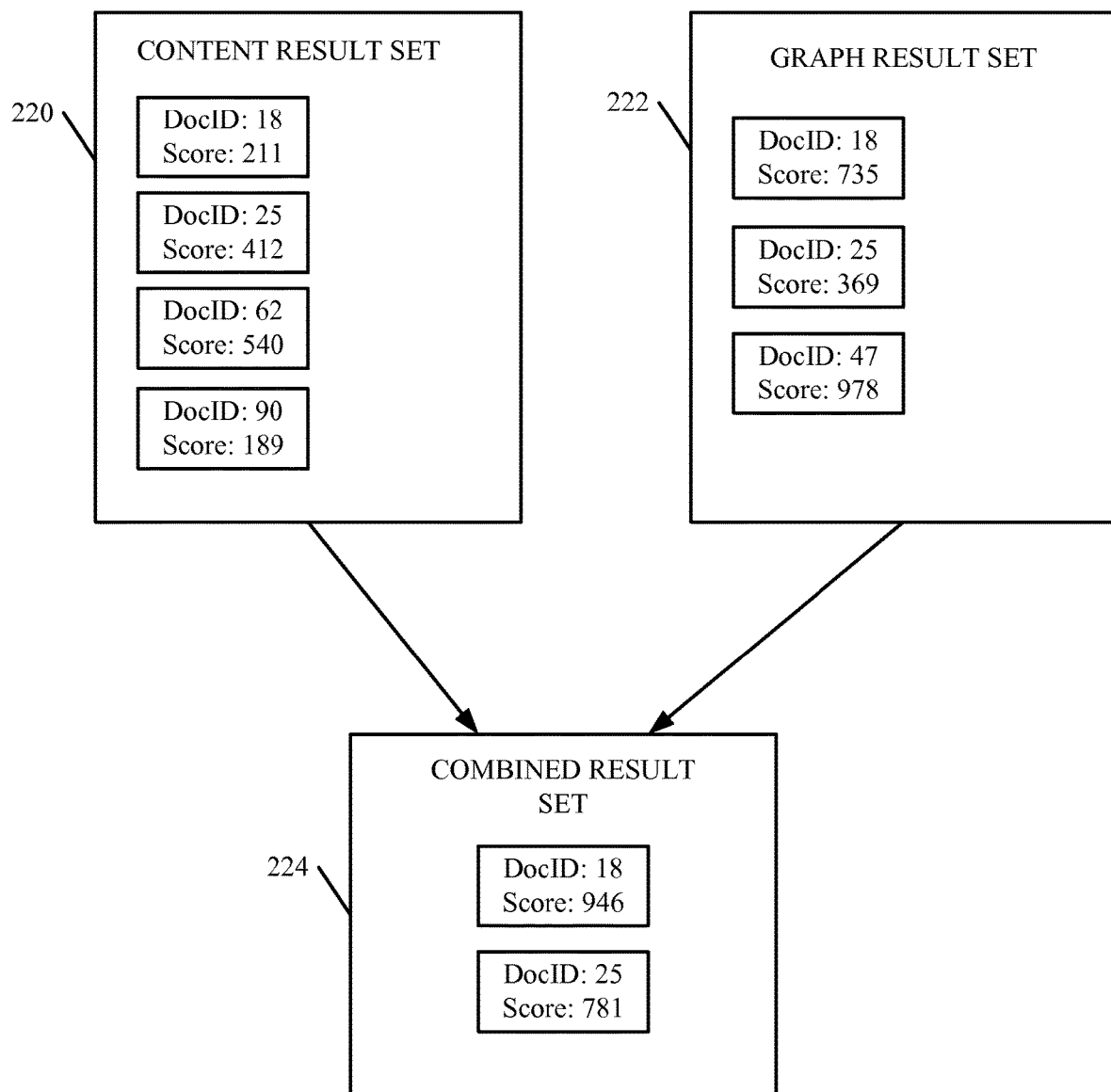
FIG. 7 is a block diagram illustrating how result sets can be combined.

Results ranking system 134 then combines the content results and the graph results to obtain a combined result set. This is indicated by block 218 in FIG. 5. This can be done in a wide variety of different ways. For instance, the combined results can be the intersection of the two result sets. FIG. 7 shows one embodiment of this type of combination. It can be seen, for instance, that FIG. 7 shows a content result set 220 and a graph result set 222. Content result set 220 includes a set of four documents, each of which have a document identifier and a content result score. Graph result set 222 includes three documents, each of which include a document identifier and a graph result score. When the two result sets 220 and 222 are combined as the intersection of the result sets, a combined result set 224 is obtained. It can be seen that result set 224 includes only the documents that appeared in both result sets 220 and 222. The score for those two documents is reflected as a combination of the content result score and the graph result score. In the embodiment shown in FIG. 7, the two scores are added together, but this is only one illustrative way of combining the scores. Providing the combined results as the intersection of the two result sets is indicated by block 226 in FIG. 5.

In another embodiment, the combined result set is a superset of all of the results in both content result set 220 and graph result set 222. In such an embodiment, result ranking system 134 can use the graph result scores to influence the content result scores when the combined result set is generated. This is indicated by block 228 in FIG. 5. The results can then be ranked or sorted based on score. This is indicated by block 229.

Of course, the combined result set can be obtained in other ways as well. This is indicated by block 230.

At some point during the processing shown in FIG. 5, access control can be implemented. For instance, it may be that some users do not have access to all of the contents that can be returned by system 102, for security reasons or for other reasons. In that case, search system 102 illustratively performs access control operations to eliminate, from the retuned result set, any content that the user does not have access to. Performing any desired types of access control is indicated by block 232 in FIG. 5.

Result sorting system 148 then sorts the combined results based upon the overall scores that have been assigned to them. The sorting system 148 then provides results 130 as the combined result set output in rank order. This is indicated by block 234 in FIG. 5.

Figure 8:
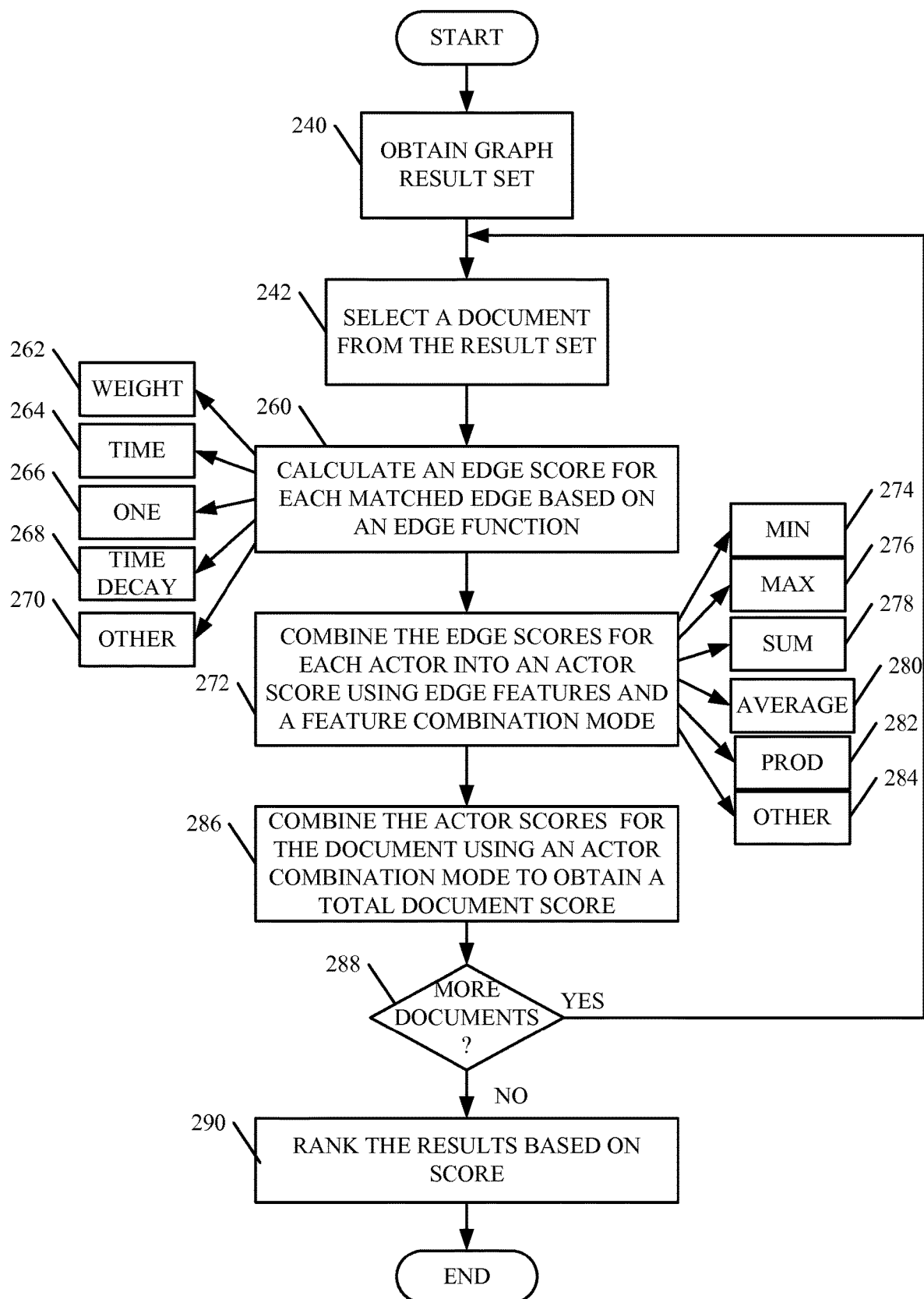
FIG. 8 is a flow diagram illustrating one embodiment of the architecture shown in FIG. 1 in scoring and ranking search results.

FIG. 8 is a flow diagram illustrating one embodiment of the operation of graph ranking component 136, in utilizing a graph ranking model 104, to rank the edge structures that satisfy the graph query portion 204 of the query 128, in order to calculate a score per result (e.g., per document). Graph ranking component 136 first receives the graph result set returned by graph query component 130. This is indicated by block 240 in FIG. 8. The present discussion will proceed with respect to the results being documents. It will be noted that they can be other types of information as well, and documents are only one example.

Graph ranking component 136 first selects a document from the result set. This is indicated by block 242.

Figure 9:
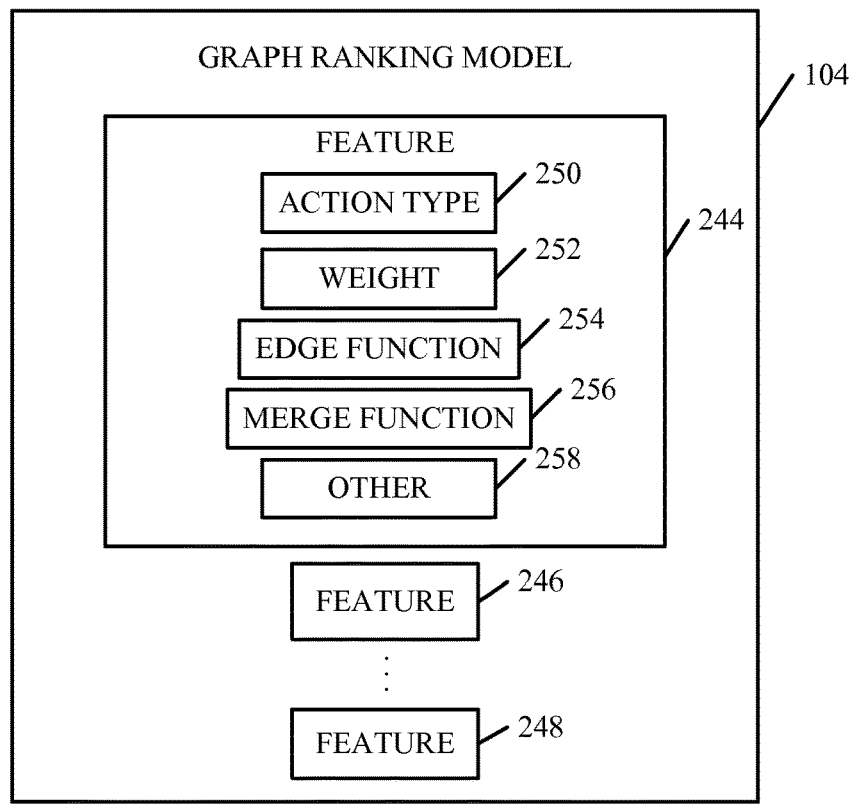
FIGS. 9 and 9A show block diagrams of two illustrative graph ranking models.

Graph ranking component 136 then accesses the graph ranking model to calculate a score for the selected document. FIG. 9 shows one embodiment of a graph ranking model 104. In the embodiment shown in FIG. 9, graph ranking model 104 includes a list of features 244, 246 and 248. While only three features 244-248 are shown, they are shown for the sake of example only, and there may be a larger number of features in graph ranking model 104. Each of the features 244-248 illustratively include an action type 250, a feature weight 252, an edge function 254 and a merge function 256, although they can include other information 258 as well.

The action type defines the type of action represented by the edges corresponding to feature 244. The weight 252 defines the weight for that action. Weight 252 is different than the edge weight 166 (shown in FIG. 3) in that the edge weight 166 indicates a weight for a particular edge, relative to other edges having the same action type. Feature weight 252, on the other hand, indicates a weight for a feature, relative to other features. Edge function 254 illustratively identifies how the edge score for a matched edge of the given action type is to be calculated, and merge function 256 illustratively identifies how multiple edge scores of a same type from a same actor to a same document are to be combined. This is described in greater detail below with respect to Table 4.

Figure 9A:
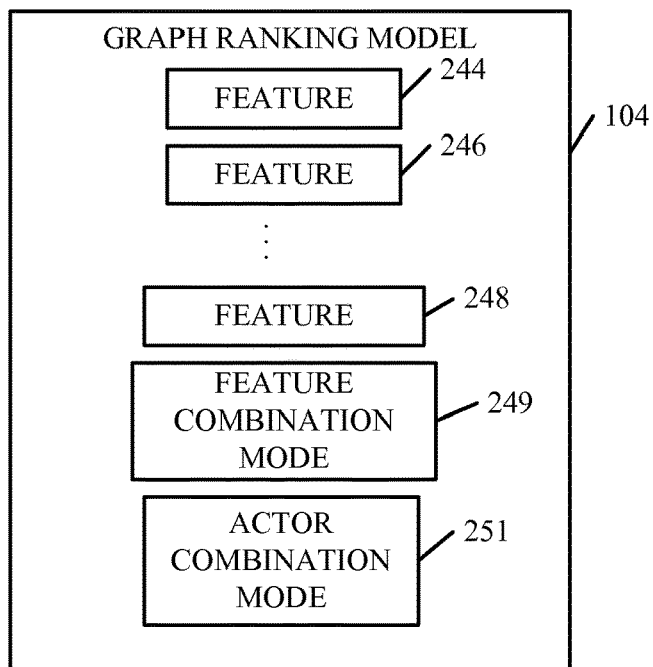

FIG. 9A shows another example of model 104. It is similar to FIG. 9 and similar items are similarly numbered. However, it shows that model 104 now includes a feature combination mode 249 and actor combination mode 251. Feature combination mode 241 describes how feature scores are combined and actor combination mode 241 describes how all actor scores are combined.

By way of another example, it may be that an actor is related to a document in multiple different ways. For instance, the actor may have viewed the document (which is one relationship), but the actor may also have edited the document, which is another type of relationship. In that case, a graph query may match both edges that correspond to the "view" and "edit" action types. The edge function 254 for each edge will identify how the edge score for the corresponding edge is to be calculated, and the feature combination mode identifies how the features are to be combined, or merged, for the identified actor and the identified document.

Graph ranking component 136 then calculates an edge score for each matched edge, for the selected document, based on the edge function 254 corresponding to each edge. This is indicated by block 260 in FIG. 8. Edge function 254 is part of the rank model. There are a variety of different types of edge functions that can be used to calculate the score for a given edge. For instance, in one embodiment the edge score is simply the weight 252 that is assigned to the edge in the given feature. This is indicated by block 262. In another embodiment, the edge weight is calculated as the edge time stamp that is included in the edge, converted to some integer, such as ticks. This is indicated by block 264 in FIG. 8. In another embodiment, the edge score is unity. In that case, if the edge is matched it has a score of 1, and if it is not matched it has a score of 0. This is indicated by block 266.

In another embodiment, the edge score is calculated based on a time decay function. In such an embodiment, the matched edge will include a time stamp. A time decay function is part of the rank model 104. The time decay function may, for instance, have a halftime parameter that identifies (e.g., in hours) the halftime of the matched edge. By way of example, it may indicate that, if a certain number of hours have passed since the edge time stamp, then the score for the matched edge is to be reduced by a certain amount. As one example, the time decay function can be computed as halftime/(t+halftime), where t is the number of hours since the time stamp for this edge. In addition, the output of the time decay function can be multiplied by the edge weight. Computing the edge score based on a time decay function is indicated by block 268 in FIG. 8. Of course, the edge score can be computed in other ways as well, and this is indicated by block 270.

Graph ranking component 136 then combines the edge scores for the selected document, for each actor, into an actor score using the various edge features corresponding to the selected document, and a feature combination mode 249. Combining the edge scores for each actor into an actor score is indicated by block 272 in FIG. 8.

The feature combination mode 249 can be any of a variety of different types of combinations. For example, the feature combination mode 249 can be the minimum 274 of the weighted features, the maximum of the weighted features 276, the sum 278, the average 280, the product 282, or other measures 284. Table 1 below, for instance, shows a plurality of different types of feature combination modes that can be used to combine the feature scores (or edge scores) into an actor score for a given actor. For Table 1 below, it is assumed that $W_f$ is the weight of a feature f, and $S_f$ is the score for that feature.

TABLE 1

| Name | Score | Is the default mode |
|---|---|---|
| Min | $\min (W_f * S_f)$ | No |
| Max | $\max (W_f * S_f)$ | Yes |
| Sum | $\Sigma (W_f * S_f)$ | No |
| Avg | $\dfrac{\Sigma (w_f * s_f)}{\Sigma w_f}$ | No |
| Prod | $\Pi s_f^{w_f}$ | No |

In the embodiment shown in FIG. 8, after the actor score is calculated for the selected document, then all of the actor scores for the document are combined using an actor combination mode 251 to obtain a total document score. This is indicated by block 286 in FIG. 8. In one embodiment, the total score can be calculated using some, all, or different combination modes as those shown in Table 1, except that the weights (or importance) specified in an actor operator can be used as the weight, instead of the weight specified in the edge.

Graph ranking component 136 then determines whether there are additional documents in the result set for which a graph ranking score is to be calculated. This is indicated by block 288 in FIG. 8. If so, processing reverts to block 242 where the next document is selected from the result set. If not, however, then processing continues at block 290, where result sorting system 148 sorts or ranks the results according to the score.

Figure 10:
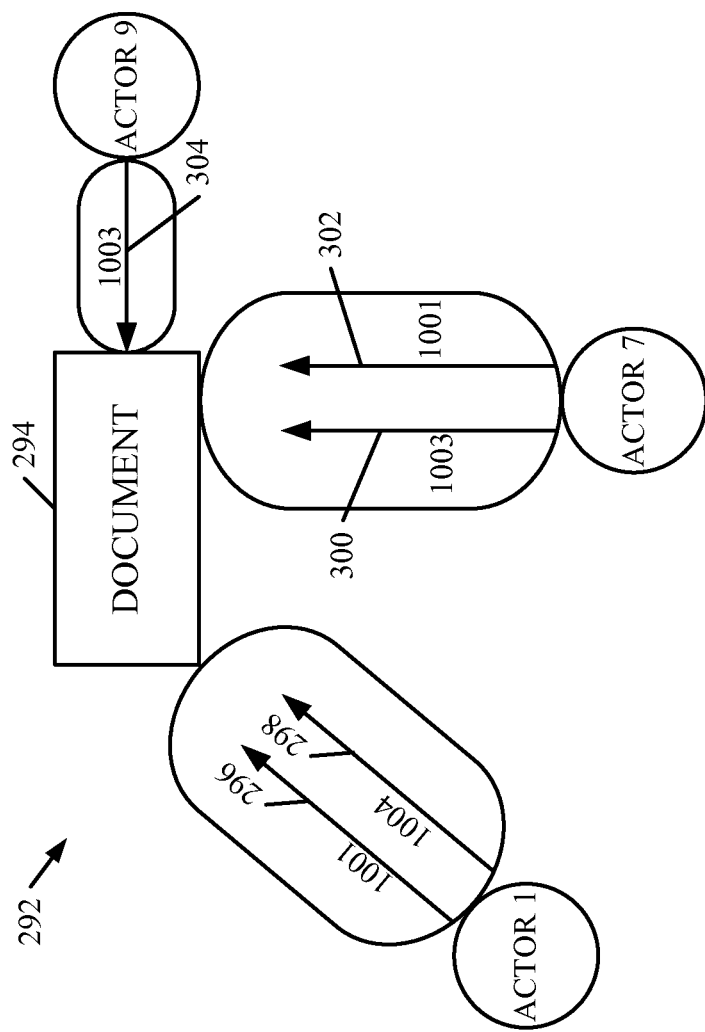
FIG. 10 is a block diagram of one illustrative document connected to a plurality of different actors using edges.

A number of examples will now be described. FIG. 10 shows one exemplary structure 292. Structure 292 shows that a plurality of different actors (Actor 1, Actor 7 and Actor 9) all have edge structures that connect them with document 294. Actor 1 has two edge structures 296 and 298. Actor 7 has two edge structures 300 and 302, and Actor 9 has one edge structure 304.

Each of the edge structures is labeled with an action type. For the sake of the example shown in FIG. 10, action 1001 corresponds to the "view" action type meaning, for instance, that Actor 1 has viewed document 294. This is represented by edge 296. Action 1003 represents the "edit" action type meaning that both Actors 7 and 9 have edited document 294. This is indicated by edges 300 and 304. Action 1004 corresponds to the "like" action type meaning that Actor 1 has "liked" document 294, such as on a social network site. This is indicated by edge 298.

Table 2 below is an example of code that will return documents that any of Actors 1, 7 and 9 have either viewed, edited or liked.

TABLE 2

| view | edit | like |
|---|---|---|
| AND( | | |
| ACTOR(1,OR(action:1001, action:1003, action:1004)), | | |
| ACTOR(7,OR(action:1001, action:1003, action:1004)), | | |
| ACTOR(9,OR(action:1001, action:1003, action:1004)) | | |
| ) | | |

Table 3 shows one embodiment of a graph ranking model that can be used to calculate a score for each of the matched edges.

TABLE 3

GraphRankingModel;action\:action\:1003\,weight\:1\,edgeFunc\:time\,mergeFunc\:max;action\:1001\,weight\:1\,edgeFunc\:time\,mergeFunc\:max;action\:1004\,weight\:1\,edgeFunc\:time\,mergeFunc\:max The graph ranking model indicates that, for action 1003 (the "edit" action), its corresponding weight is 1, the edge function is the "time" function and the merge function is the "max" function. The same is true for both actions 1001 and 1004. Table 4 illustrates pseudocode for scoring document 294.

TABLE 4

```
for each actor a
{
  for each feature f
  {
    for each edge e from a->d matching feature f
    {
      append function(e) to f_edge_scores;
    }
    f_score = f_weight * f_mergeFunc(f_edge_scores);
    // f_score is 0 if no edges from a->d
    match feature f append f_score to a_feature_scores;
  }
  a_score = a_importance * sum(a_feature_scores);
  append a_score to d_actor_scores;
}
d_score = average(d_actor_scores);
```

Table 5 shows another embodiment of pseudocode for scoring document 294. It can be seen that the pseudocode in Table 5 is similar to that shown in Table 4, except that instead of computing the actor score by multiplying by a fixed function (such as the sum of the feature scores), the pseudocode in Table 5 allows the actor score to be computed using any of a variety of different types of feature combination functions, such as max, min, sum, average, etc.

TABLE 5

```
for each actor a
{
  for each feature f
  {
    for each edge e from a->d matching feature f
    {
      append function(e) to f_edge_scores;
```

TABLE 5-continued

```
  }
  f_score = f weight * f_mergeFunc(f_edge_scores);
  // f_score is 0 if no edges from a->d match f
  append f_score to a_feature_scores;
  }
  a_score = a_importance *
featureCombination(a_feature_scores);append a_score to
d_actor_scores;
  }
  d_score = actorCombiantion(d_actor_scores);
```

Table 6 shows another embodiment of a graph ranking model for scoring document 294. Table 6 shows that the edge scores are calculated using the edge time function, with a weight of 1. The feature score is the maximum of all of the edge scores of that action type. The actor score is the maximum of all of the feature scores, and the total score is the maximum of all of the actor scores.

TABLE 6

```
GraphRankingModel =
{
  features : [
          { function:"edgetime", weight: 1, edgeCombination:max
  }      ],
  featureCombination : max,
  actorCombination : max,
}
```

Table 7 shows another embodiment of a graph ranking model that calculates the feature score for the three different actions shown in FIG. 10. The "view" action has a weight of 20 and the edge function is the "time decay" function with a half time of 24 hours. The "edit" action has a weight of 70 and the edge function is the time decay function with a half time of 48 hours. The "like" action has a weight of 30 and its edge function is also the time decay function with a have time of 96 hours. The actor score for each actor is the maximum of all feature scores for that actor and the overall score is the average of all of the actor scores.

TABLE 7

```
GraphRankingModel =
{
  features : [
          { action:1001, weight:20, function:"timedecay(24)" },
          { action:1003, weight:70, function:"timedecay(48)" },
          { action:1004, weight:30, function:"timedecay(96)" }
          ],
  featureCombination : max,
  actorCombination : avg,
}
```

Table 8 shows another embodiment of a graph ranking model for ranking document 294. The edge function is 1 for the "like" action type. Therefore, every time the document was liked, the score increases by 1. The feature scores are combined to obtain an actor score for each actor, by summing the feature scores for that actor.

TABLE 8

```
GraphRankingModel =
{
  features : [
          { action:1004, function: "one" }
          ],
  actorCombination : sum,
}
```

Table 9 shows another embodiment of a graph ranking model that sums all actions and weights the actions by action type. For instance, the "view" action has a weight of 1 and an edge function of 1. The "edit" action has a weight of 5 and an edge function of 1, and the "like" action has a weight of 3 and an edge function of 1. The actor scores for each given actor are calculated by summing the feature scores for that actor. The total score for a document is calculated by summing the actor scores for that document.

TABLE 9

```
GraphRankingModel =
{
  features : [
          { action:1001, weight: 1, function: "one" }
          { action:1003, weight: 5, function: "one" }
          { action:1004, weight: 3, function: "one" }
          ],
  featureCombination : sum,
  actorCombination : sum,
}
```

Table 10 shows another embodiment of how the query can be changed in order to weight the actors. Each actor in the query shown in Table 10 has an importance (or weight). Actor 1 has an importance of 10, Actor 7 has an importance of 7 and Actor 9 has an importance of 3. The actor scores will thus be multiplied by the importance before the document score for document 294 is calculated.

TABLE 10

```
AND(
    ACTOR(1,OR(action:1001, action:1003, action:1004),
    importance=10),
    ACTOR(7,OR(action:1001, action:1003, action:1004),
    importance=7),
    ACTOR(9,OR(action:1001, action:1003, action:1004),
    importance=3)
)
```

Table 11 shows another embodiment of a graph ranking model that scores and sorts edges by time stamp across actions and actors. It is similar to the graph ranking model shown in Table 6, except that it specifies the time property.

TABLE 11

```
GraphRankingModel =
{
  features : [
          { property:time },
          ],
  featureCombination : max,
  actorCombination : max,
}
```

Table 12 shows another embodiment of a graph ranking model that uses the time decay of edge time stamps in order to score and sort edges. It is similar to the graph ranking model shown in Table 7 except that, instead of an edge function, an edge property is specified plus a transform which is applied to the value of the specified property. That is, for each action type, it specifies a property of time and includes a transform (a "freshness" function) that operates on the value of the time property.

TABLE 12

```
GraphRankingModel =
{
   features : [
            { action:1001, weight:20, property:time,
                transform: { type:freshness,
                    parameters = [ { name:c, value:0.3} ] } }
            { action:1003, weight:70, property:time,
                transform: { type:freshness,
                    parameters = [ { name:c, value:0.2} ] } }
            { action:1004, weight:30, property:time,
                transform: { type:freshness,
                    parameters = [ { name:c, value:0.1} ] } }
        ]
   featureCombinationMode : max,
   actorCombinationMode : avg,
}
```

Table 13 shows another embodiment of a graph ranking model that scores and sorts documents based on the total number of "likes". It is similar to the graph ranking model shown in Table 8, except that for the "like" action type, it specifies a weight of 1.

TABLE 13

```
GraphRankingModel =
{
   features : [
            {action:1004, weight: 1, property:""}
        ]
   featureCombinationMode : max,
   actorCombinationMode : sum,
}
```

It can thus be seen that a graph ranking model 104 can be specified at query time, either within the query itself, or by identifying a graph ranking model identifier that corresponds to a graph ranking model that is persisted in a data store and referenced in the query. Also, each edge in the graph can have a time stamp, and that can be used together with a time decay function to make recent actions count more. An action type-specific time decay rate can be specified as well. Each edge in the graph can have weights. The weight can represent the importance of that type of interaction, relative to other actions of the same type. The weights can be used in query-time ranking. In addition, the ranking model can give weights both to the actor and to the action types. The sub-scores for each of the edges, action types or actors can be combined in different ways (such as min, max, sum, average, product, etc.) to obtain an overall score.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
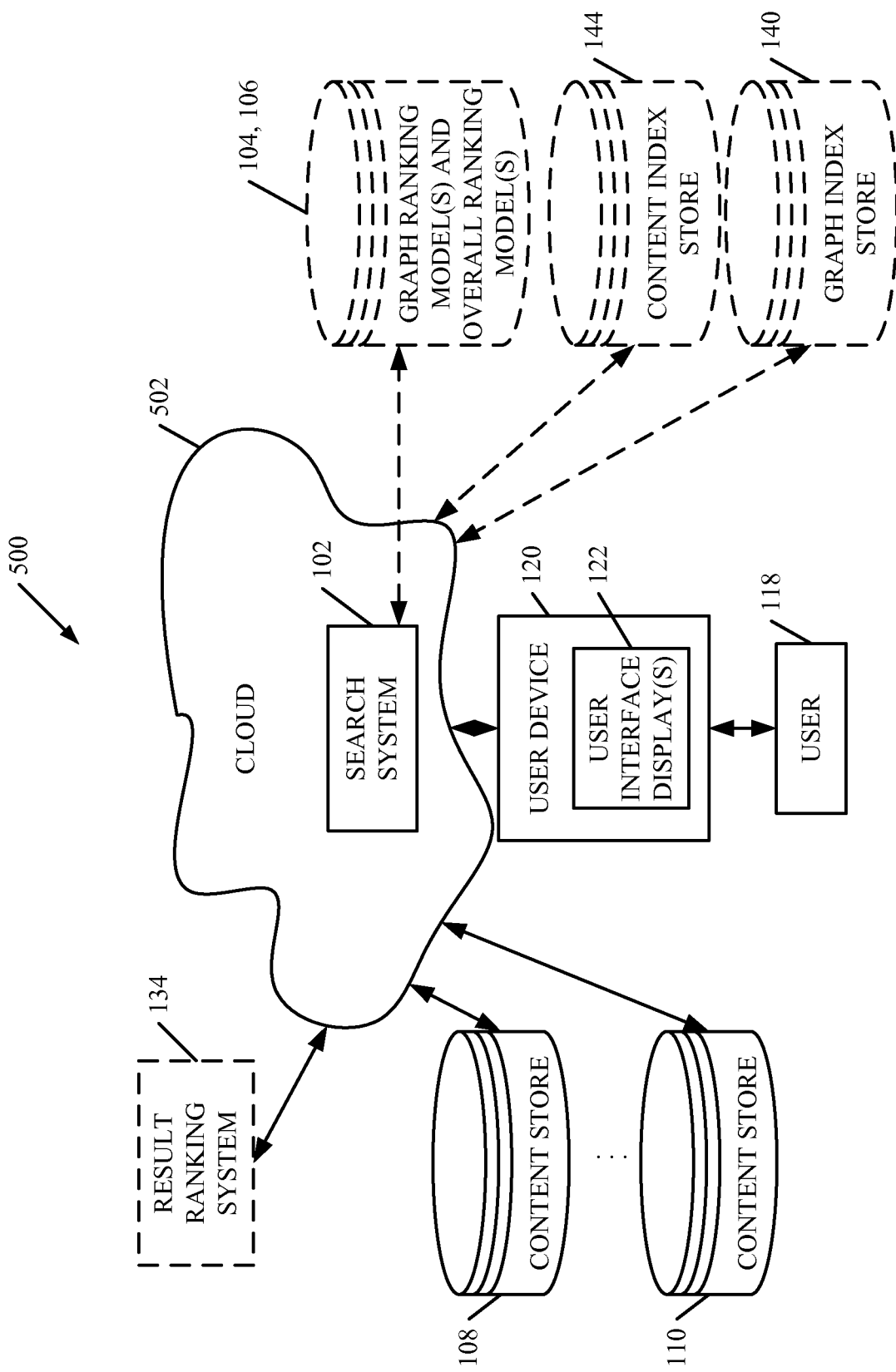
FIG. 11 is a block diagram showing the architecture of FIG. 1 deployed in a cloud computing architecture.

FIG. 11 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 11, some items are similar to those shown in FIG. 1 and they are similarly numbered. FIG. 11 specifically shows that system 102 can be located in cloud 502 (which can be public, private, or a combination where portions are public while others are private). Therefore, user 118 uses a user device 120 to access those systems through cloud 502.

FIG. 11 also depicts another embodiment of a cloud architecture. FIG. 11 shows that it is also contemplated that some elements of search system 102 can be disposed in cloud 502 while others are not. By way of example, data stores 104, 106, 140, 144 can be disposed outside of cloud 502, and accessed through cloud 502. In another embodiment, result ranking system 134 and can also be outside of cloud 502. Regardless of where they are located, they can be accessed directly by device 120, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
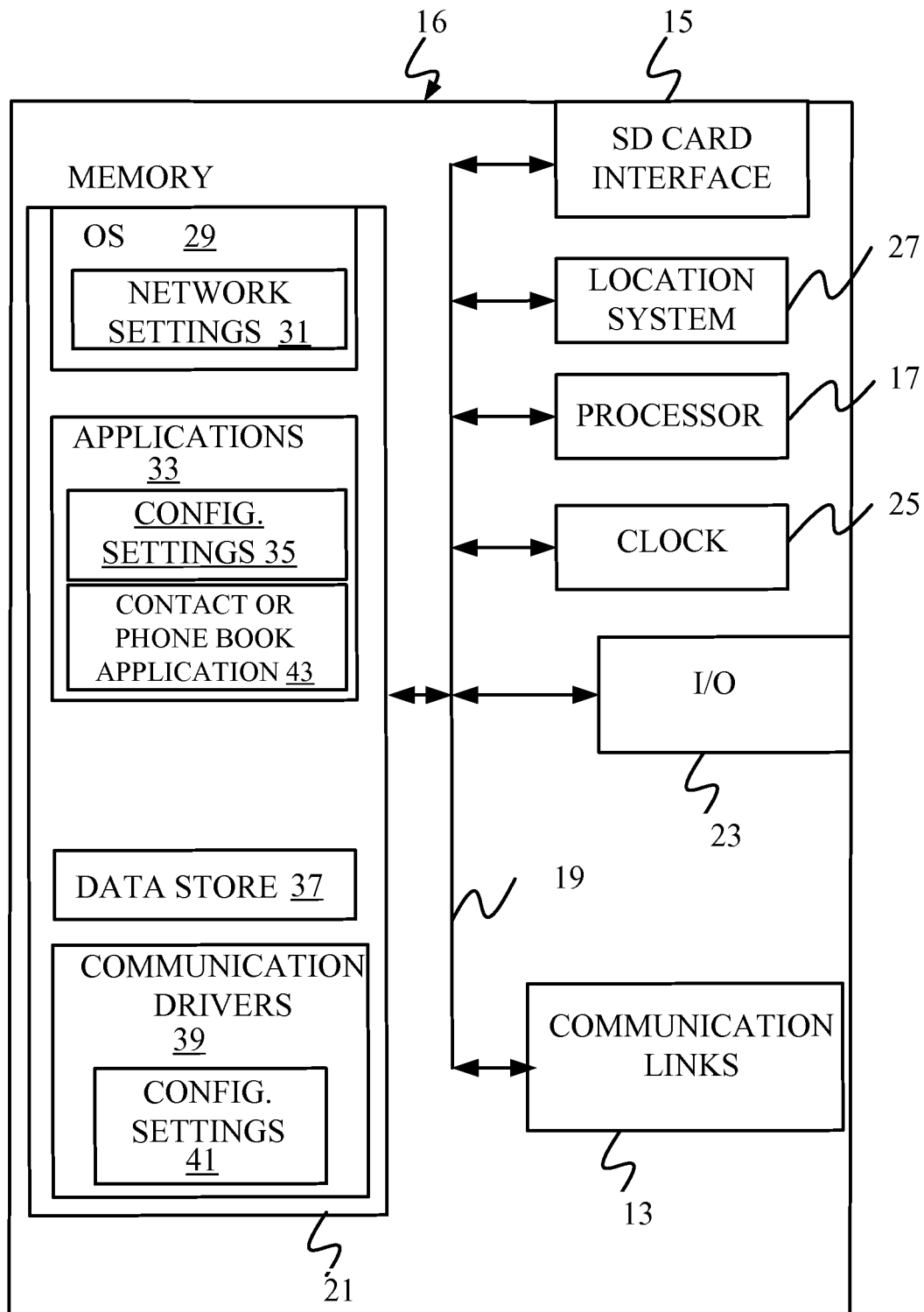
FIGS. 12-16 show examples of mobile devices.

FIG. 12 is a simplified block diagram of one illustrative embodiment of a handheld or mobile computing device that can be used as a user's or client's hand held device 16, in which the present system (or parts of it) can be deployed. FIGS. 13-16 are examples of handheld or mobile devices.

FIG. 12 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 150 or the processor in user device 120 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 13:
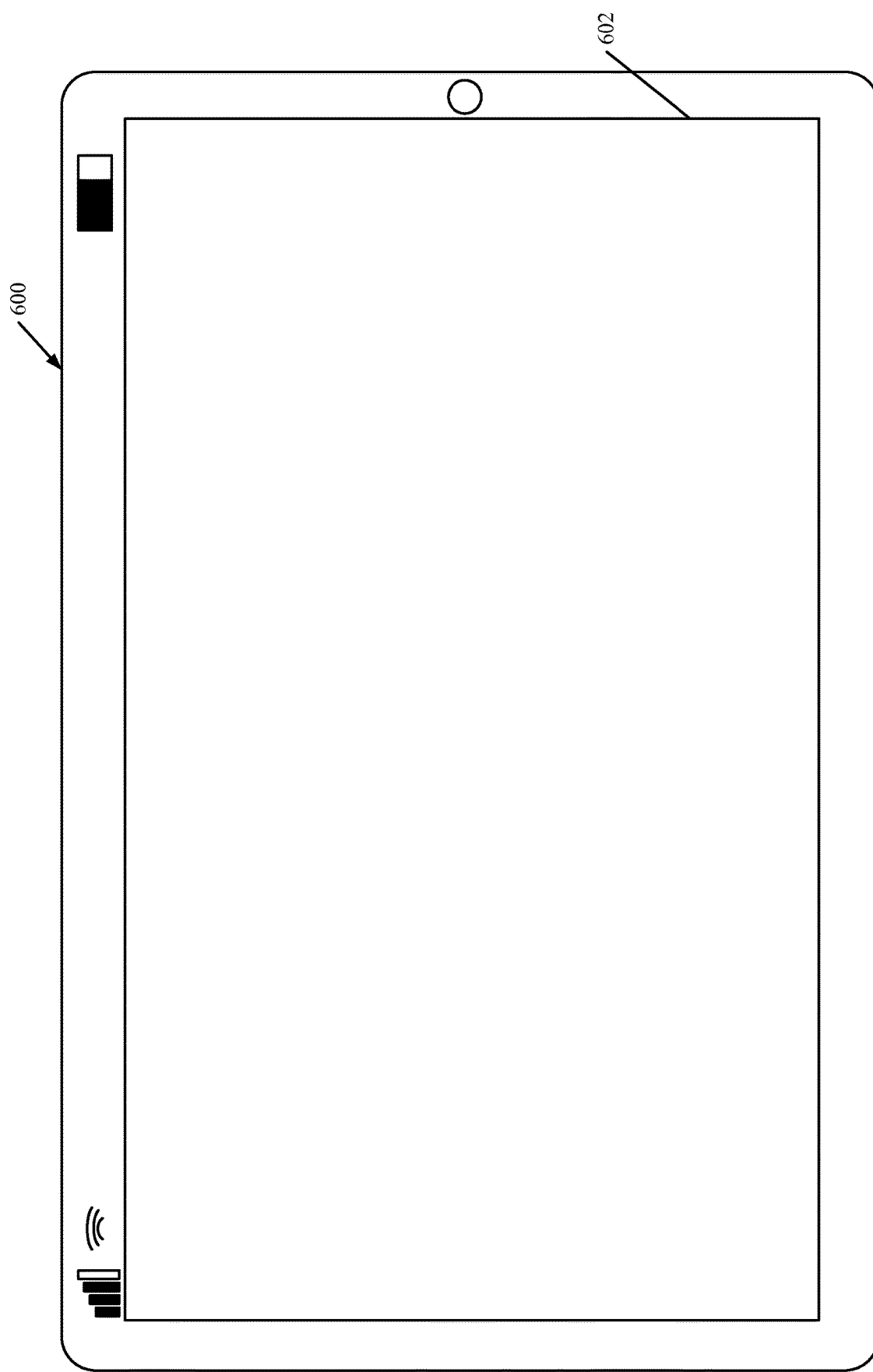

FIG. 13 shows one embodiment in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 14:
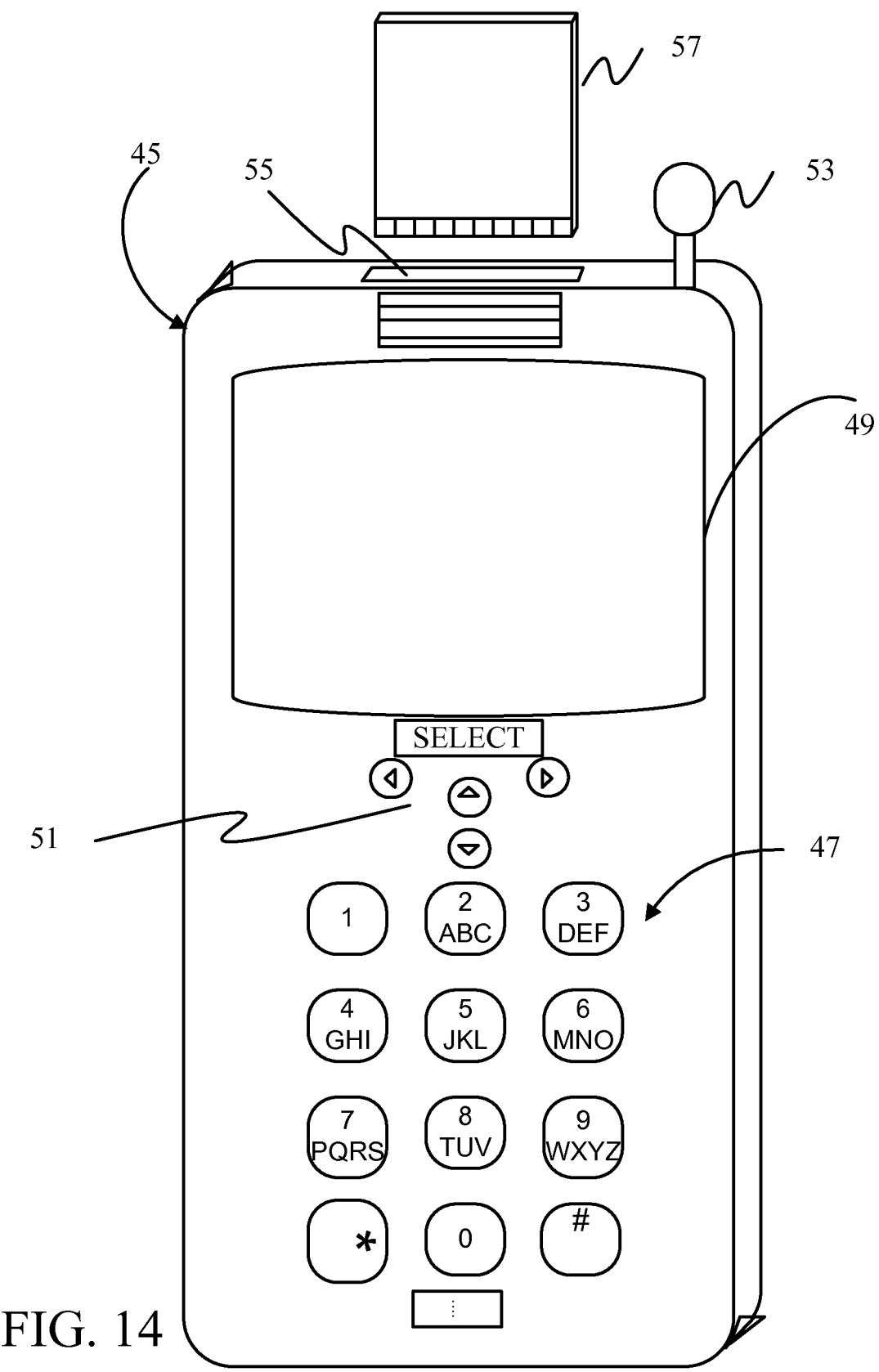
Figure 15:
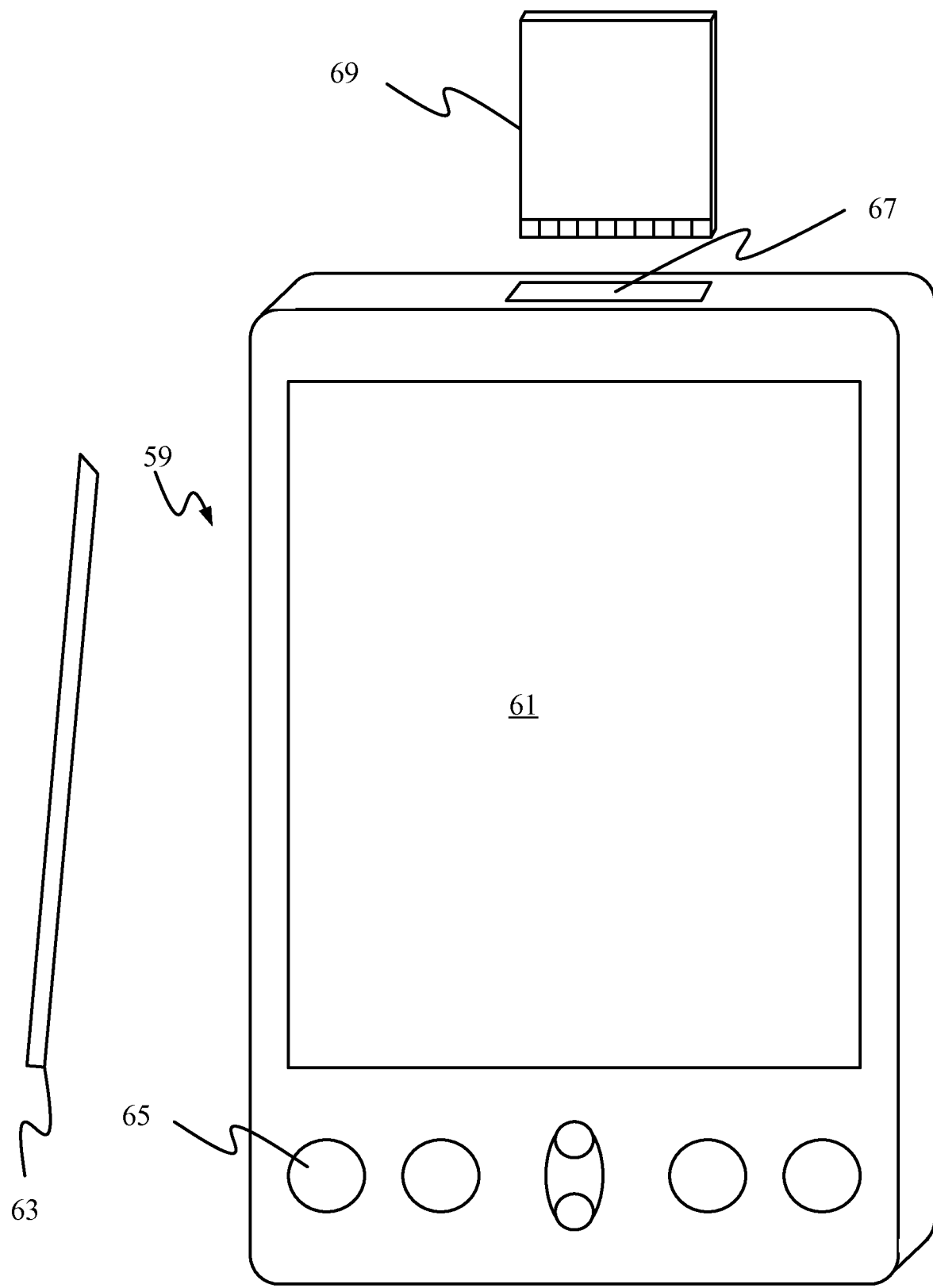

FIGS. 14 and 15 provide additional examples of devices 16 that can be used, although others can be used as well. In FIG. 14, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 15 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 16:
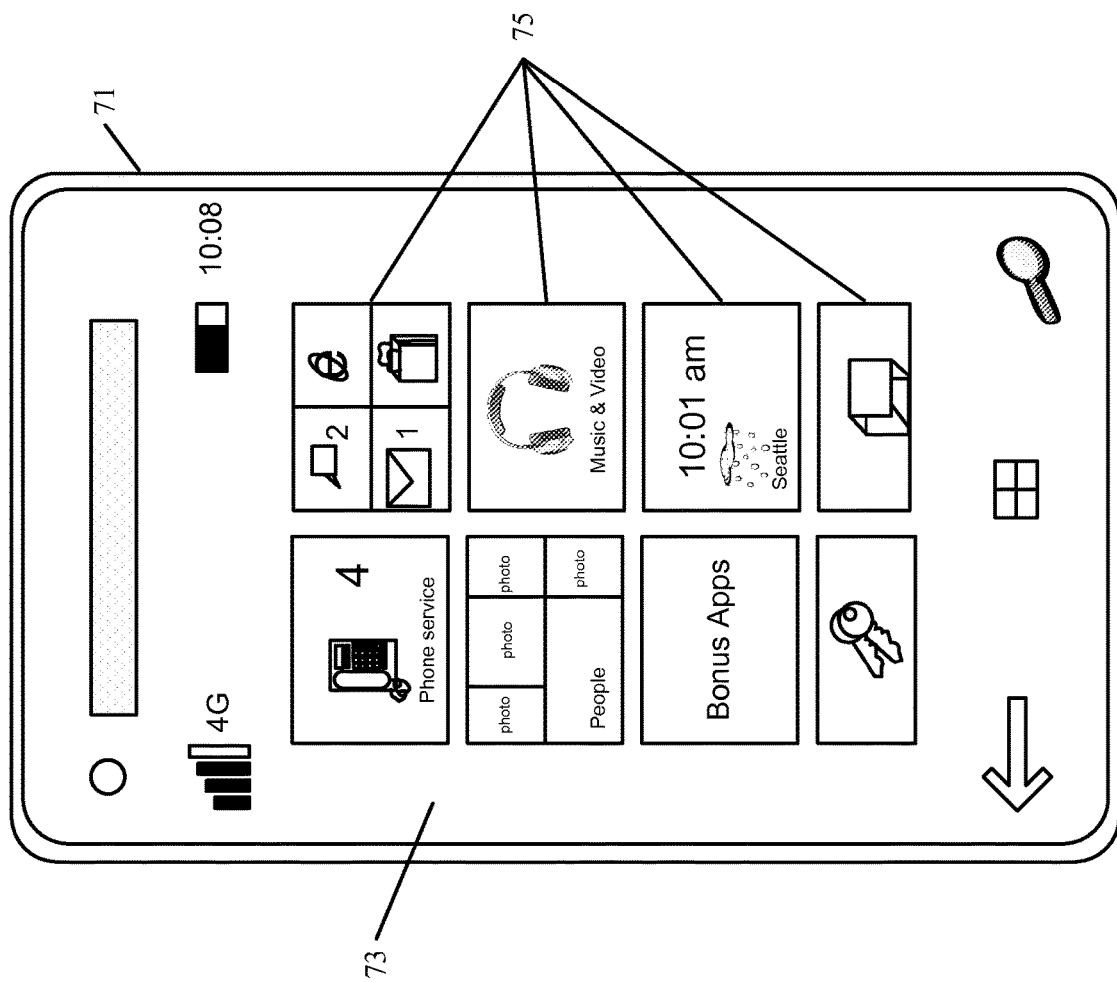

FIG. 16 is similar to FIG. 14 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
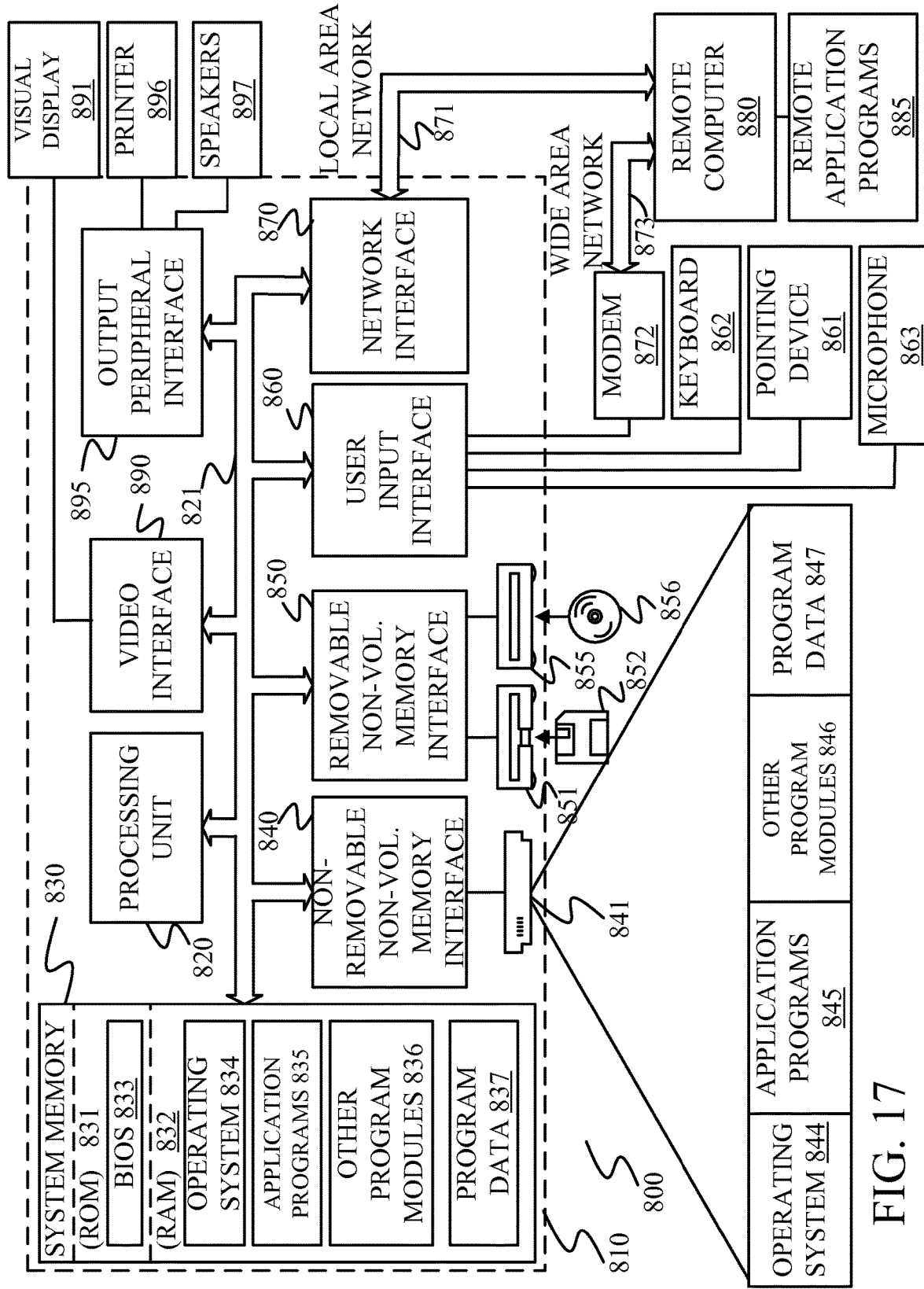
FIG. 17 shows one embodiment of a computing environment.

FIG. 17 is one embodiment of a computing environment in which architecture 100, or parts of it, (for example) can be deployed. With reference to FIG. 17, an exemplary system for implementing some embodiments includes a general-purpose computing device in the form of a computer 810. Components of computer 810 may include, but are not limited to, a processing unit 820 (which can comprise processor 150 or the processor in user device 120), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 17.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 17 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 17 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving a query identifying a graph ranking model and comprising a graph query portion for execution against a graph index and a content query portion for execution against a content index, the graph index storing edge structures that each identify an actor connected to an object by a corresponding edge that includes edge information indicating a type of relationship between the actor and the object, wherein the type of relationship comprises a type of action performed by the actor relative to the object and the edge information includes weight information that weights actions of a same type relative to one another;
   executing the graph query portion against the edge structures in the graph index to obtain matching edge structures as graph search results;
   ranking the graph search results using the graph ranking model identified in the query to produce ranked graph search results, wherein each of the ranked graph search results represents a document and comprises a graph search result identifier and a graph search result score, wherein generating the graph search result score comprises:
      generating an edge score for each edge in a graph search result based on the weight information for a corresponding edge; and
      generating an actor score for the graph search result based on an actor weight for each actor;
   executing the content query portion against the content index to obtain matching content search results, wherein each of the content search results represents a document and comprises a content search result identifier and a content search result score;
   combining graph search result scores of the ranked graph search results with content search result scores of the content search results to obtain a combined set of results, wherein the combining comprises adding the graph search result scores to the content search result scores to calculate combined search result scores; and
   returning the combined set of results as a response to the query, wherein the combined set of results:
      comprises a search result identifier and a combined search result score for each document in the combined set of results;
      is ordered based on the combined search result scores; and
      incudes only documents that appeared in the content search results and the graph search results.

2. The computer-implemented method of claim 1 wherein the graph ranking model ranks the graph search results by:
   generating the graph search result score for each graph search result based on the edge information; and
   ranking the graph search result based on the graph search result score.

3. The computer-implemented method of claim 2 wherein generating the graph search result score comprises:
   generating an edge score for each edge in a selected graph search result;
   combining the edge scores to obtain an actor score for each actor in the selected graph search result; and
   combining the actor scores to obtain an object score for the object in the selected graph search result.

4. The computer-implemented method of claim 1 wherein:
   the edge information includes a timestamp indicative of a time when an action was last performed; and
   generating the edge score comprises generating the edge score based on the timestamp.

5. The computer-implemented method of claim 4 wherein generating the edge score based on the timestamp comprises generating the edge score based on a time decay function that reduces the edge score as the timestamp ages.

6. The computer-implemented method of claim 3 wherein combining the edge scores and combining the actor scores are performed using different combination functions.

7. The computer-implemented method of claim 1 wherein receiving the query comprises receiving a graph ranking model identifier that identifies a location of the graph ranking model.

8. The computer-implemented method of claim 1 wherein the graph ranking model comprises a set of features, each feature of the set of features:
   corresponding to an action type;
   having a feature weight; and
   specifying how edge scores of the action type are both calculated and combined.

9. The computer-implemented method of claim 1 wherein:
   ranking the graph search results comprises producing an object score for each graph search result based on the edge information;
   executing the content query portion comprises generating a score for each of the matching content search results to produce ranked content search results; and combining the graph search result scores with the content search result scores comprises combining object scores for ranked graph search results with scores for ranked content search results.

10. A search system, comprising:
   at least one processor; and
   one or more memories storing instructions, that when executed by the at least one processor, cause operations to be performed, the operations comprising:
   receiving a set of graph search results related to a graph query portion of a received query, the received query identifying a graph ranking model and comprising the graph query portion for execution against a graph index and a content query portion for execution against a context index, the graph index storing edge structures that each identify an actor connected to an object by a corresponding edge that includes edge information indicating a type of relationship between the actor and the object, wherein the type of relationship comprises a type of action performed by the actor relative to the object and the edge information includes weight information that weights actions of a same type relative to one another;
   generating a graph search result score for each graph search result in the set of graph search results according to the graph ranking model identified in the received query, wherein generating the graph search result score comprises:
     generating an edge score for each edge in a graph search result based on the weight information for a corresponding edge; and
     generating an actor score for the graph search result based on an actor weight for each actor;
   ranking, by a graph ranking mechanism, each graph search result in the set of graph search results based on the graph search result score generated for that graph search result to produce ranked graph search results, wherein each ranked graph search result comprises a graph search result identifier and a corresponding graph search result score;
   receiving a set of content search results related to the content query portion of the received query;
   generating a content search result score for each content search result in the set of content search results;
   ranking, by a content ranking mechanism, each content search result in the set of content search results based on the content search result score for that content search result to produce ranked content search results, wherein each ranked content search result comprises a content search result identifier and a corresponding content search result score;
   combining the ranked graph search results with the content search results to obtain a combined set of results formed with search results that are in both the ranked graph search results and the ranked set of content search results, wherein the combining comprises combining the graph search result scores of the ranked graph search results with content search result scores of the content search results to calculate combined search result scores; and
   providing the combined set of results as a response to the received query, wherein the combined set of results:
     comprises a search result identifier and a combined search result score for each document in the combined set of results;
     is ordered based on the combined search result scores; and
     incudes only documents that appeared in the content search results and the ranked graph search results.

11. The search system of claim 10 wherein the graph ranking model comprises:
   a set of features corresponding to types of relationships between actors and objects;
   a feature weight;
   an edge function indicative of how edge scores are to be calculated for the graph search results; and
   a merge function indicative of how edge scores are to be combined for the graph search results.

12. The search system of claim 11 wherein the edge information includes time information and wherein the edge function comprises a time decay function.

13. A computer readable storage device that stores computer executable instructions which, when executed by a computer, cause the computer to perform a method, comprising:
   receiving a query identifying a graph ranking model and comprising a graph query portion for execution against a graph index and a content query portion for execution against a content index;
   executing the graph query portion against edge structures in the graph index to obtain matching edge structures as a set of graph search results, each graph search result comprising an edge structure identifying an actor connected to an object by a corresponding edge, each edge including edge information that indicates a type of relationship between the corresponding actor and the corresponding object, wherein the type of relationship comprises a type of action performed by the actor relative to the object and wherein the edge information includes weight information that weights actions of a same type relative to one another;
   executing the content query portion against the content index to obtain matching content search results;
   generating, according to the graph ranking model identified in the query, a graph result score for each graph search result based on the edge information, wherein generating the graph search result score comprises:
     generating an edge score for each edge in a selected graph search result based on the weight information for a corresponding edge; and
     generating an actor score for the graph search result based on an actor weight for each actor
   ranking the set of graph search results based on the graph result score for each graph search result to produce ranked graph search results, wherein each of the ranked graph search results comprises a graph search result identifier and a corresponding graph search result score;
   generating a content result score for each content search result;
   ranking the content search results based on the content result score for each content search result to produce ranked content search results, wherein each of the ranked content search results comprises a content search result identifier and a corresponding content search result score;
   combining the graph search results with the content search results based on the graph result scores and the content result scores to obtain a combined set of results, wherein the combining comprises adding the graph search result scores to the content search result scores to calculate combined search result scores; and returning the combined set of results, as a response to the query, wherein the combined set of results:
- comprises a search result identifier and a combined search result score for each document in the combined set of results;
- is ordered based on the combined search result scores; and
- incudes only documents that appeared in both the content search results and the graph search results.

14. The computer readable storage device of claim 13 wherein generating the graph result score comprises:
- combining edge scores to obtain an actor score for each actor in the selected graph search result; and
- combining actor scores to obtain an object score for the object in the selected graph search result.

15. The computer-implemented method of claim 1 further comprising indicating whether only graph search results are to be returned or whether the content search results can be returned regardless of whether there is a corresponding graph search result.

16. The computer-implemented method of claim 1 wherein:
- the query further identifies an overall ranking model; and
- the method further comprises ranking the combined set of results based on the overall ranking model.

17. The search system of claim 10 wherein the one or more memories store further instructions for:
- receiving an overall ranking model; and
- ranking the combined set of results based on the overall ranking model.

18. The computer-implemented method of claim 1 further comprising:
- filtering the combined set of results based on access control rules that control user access to each result in the combined set of results; and
- returning the filtered set of results as a response to the query.

19. The search system of claim 10 wherein the one or more memories store further instructions for:
- filtering the combined set of results based on access control rules that control user access to each result in the combined set of results; and
- returning the filtered set of results as a response to the received query.

20. The computer readable storage device of claim 13 wherein the method performed by the computer further comprises:
- filtering the combined set of results based on access control rules that control user access to each result in the combined set of results; and
- returning the filtered set of results as a response to the query.

* * * * *